United States Patent
Sowizral et al.

(10) Patent No.: US 6,300,965 B1
(45) Date of Patent: Oct. 9, 2001

(54) VISIBLE-OBJECT DETERMINATION FOR INTERACTIVE VISUALIZATION

(75) Inventors: Henry Sowizral, Los Altos, CA (US); Karel Zikan, Seattle, WA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/247,466

(22) Filed: Feb. 9, 1999

Related U.S. Application Data

(60) Provisional application No. 60/074,868, filed on Feb. 17, 1998.

(51) Int. Cl.[7] .................................................... G06T 15/30
(52) U.S. Cl. ............................................................. 345/622
(58) Field of Search .................................. 345/419, 420, 345/421, 428, 434

(56) References Cited

U.S. PATENT DOCUMENTS

| | | | | |
|---|---|---|---|---|
| 5,295,243 | * | 3/1994 | Robertson et al. | 395/160 |
| 6,137,499 | * | 10/2000 | Tesler | 345/440 |
| 6,223,145 | * | 4/2001 | Hearst | 703/22 |

OTHER PUBLICATIONS

Naruse et al., "Ray Tracing Using Dynamic Subtree—Algorithm and Speed Evaluation," Systems and Computers in Japan, vol. 24, No. 4, 1993, pp. 65–77.

Astruc et al., "The Cone of Vision: A New Technique for Interactive Volumetric Display," Graphical Models and Image Processing, vol. 58, No. 4, Jul. 1996, pp. 387–393.

International Search Report for Application No. PCT/US99/03225 mailed Jun. 28, 1999.

* cited by examiner

Primary Examiner—Mark Zimmerman
Assistant Examiner—Enrique L Santiago
(74) Attorney, Agent, or Firm—Conley, Rose & Tayon, PC; Jeffrey C. Hood

(57) ABSTRACT

A system and method for performing visible object determination based upon a dual search of a cone hierarchy and a bounding (e.g. hull) hierarchy. Visualization software running on a host processor represents space with a hierarchy of cones constructed by recursive refinement, and generates a hierarchy of bounding hulls from a given collection of objects by recursively grouping clusters of objects. Hull nodes in the hull hierarchy reflect cluster membership. Each hull node stores parameters which characterize a bounding hull for the corresponding cluster or object. The visualization software searches the cone and hull hierarchies starting with the root cone and the root hull. Each leaf-cone is assigned a visibility distance value which represents the distance to its closest known object. The visibility distance value of a non-leaf cone is set equal to the maximum of the visibility distance values for its subcone children. Before exploring a given cone-hull pair, a cone-restricted minimum distance between the cone and the hull is measured and compared to the visibility distance value of the cone. Only when the former is smaller than the latter will the cone be searched against the hull. Assuming the search condition is satisfied, subhulls of the given hull are again conditionally explored against the given cone (or its subcones) in ascending order of their cone-hull distances from the cone (or its subcones). When the recursive search of the two trees is completed, visible objects will have been assigned to each leaf-cone.

125 Claims, 17 Drawing Sheets

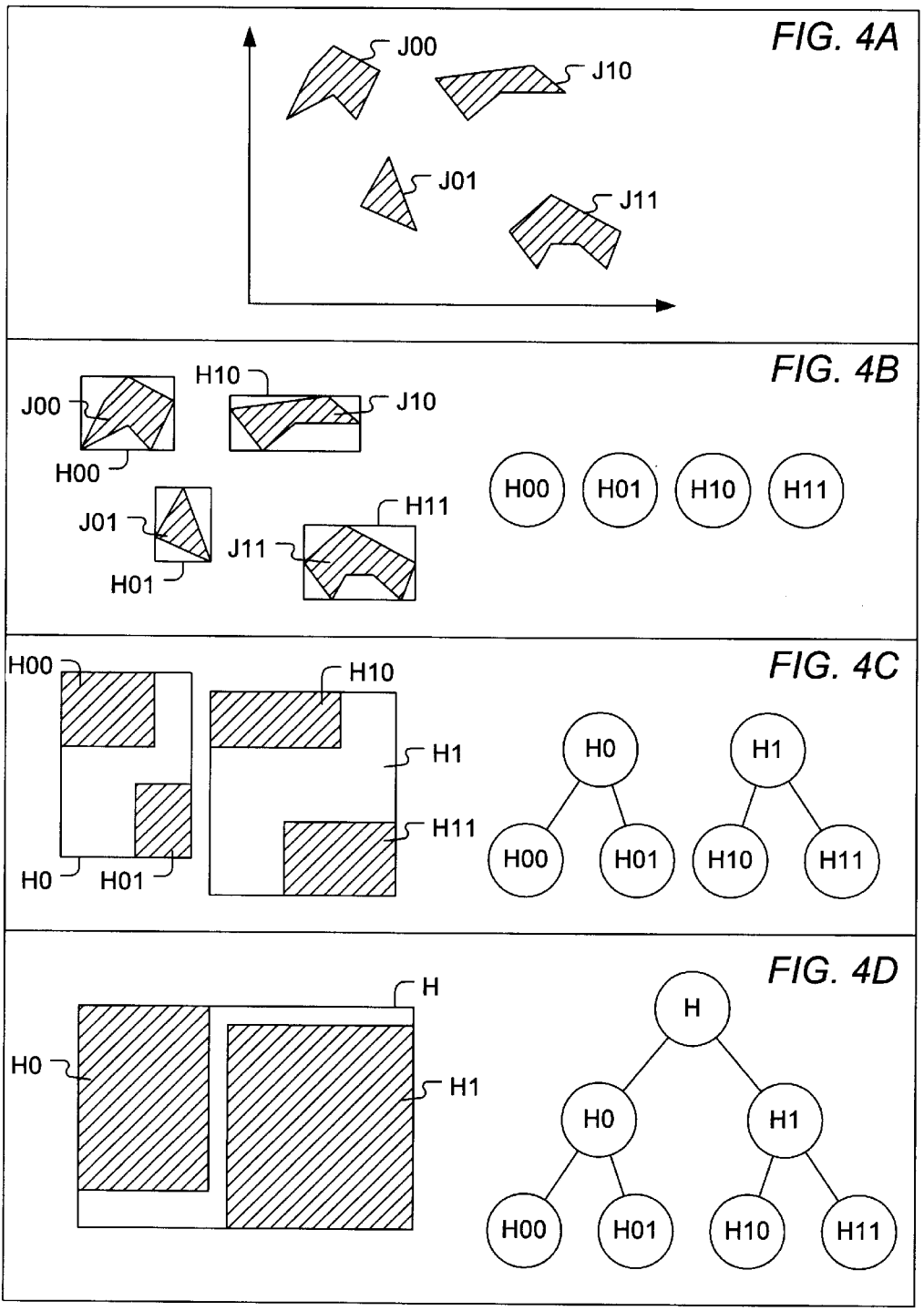

722

```
Determine Whether the Cone-Bound Separation Value of a First
Subbound of the First Bound Satisfies the Inequality Condition with
respect to the Measurement Value Associated with the First Cone
730
```

```
Searching the First Subbound with Respect to the First Cone in
Response to an Affirmative Determination that the Cone-Bound
Separation Value of the First Subbound Satisfies the Inequality Condition
with Respect to the Measurement Value Associated with the First Cone
732
```

FIG. 16

504C

```
Determine Whether the First Bound is a Leaf of the Bounding Hierarchy
and the First Cone is a Non-Leaf of the Cone Hierarchy
740
```

```
Conditionally Search Subcones of the First Cone with Respect to the
First Bound in Response to an Affirmative Determination that the First
Bound is a Leaf-Bound of the Bounding Hierarchy and the First Cone is
Non-Leaf Cone of the Cone Hierarchy
742
```

```
Computing a Cone-Bound Separation Value for the First Bound with
respect to a First Subcone of the First Cone
749
```

↓

```
Determining Whether the Cone-Bound Separation Value Satisfies the
Inequality Condition with respect to a Measurement Value Associated
with the First Subcone.
750
```

↓

```
Searching the First Subcone with Respect to the First Bound in
Response to an Affirmative Determination that the Cone-Bound
Separation Value Satisfies the Inequality Condition with respect to the
Measurement Value Associated with the First Subcone
752
```

```
Compute a First Cone-Bound Separation Value for the First Bound with
respect to a First Subcone of the First Cone
759
```

↓

```
Determining Whether the First Cone-Bound Separation Value Satisfies
the Inequality Condition with respect to a Measurement Value Associated
with the First Subcone
760
```

↓

```
Conditionally Exploring Subbounds of the First Bound with respect to the
First Subcone in Response to an Affirmative Determination that the First
Cone-Bound Separation Value Satisfies the Inequality Condition with
respect to the Measurement Value Associated with the First Subcone
762
```

*FIG. 19*

762

Computing a Second Cone-Bound Separation Value for Each of the Subbounds of the First Bound with respect to the First Subcone
770

Conditionally Searching the Subbounds of the First Bound with respect to the First Subcone in Ascending Order of their Separation from the First Subcone
772

*FIG. 20*

772

Determining Whether the Second Cone-Bound Separation Value for a First Subbound of the First Bound Satisfies the Inequality Condition with respect to the Measurement Value Associated with the First Subcone
780

Searching the First Subbound with respect to the First Subcone in response to an Affirmative Determination that the Second Cone-Hull Separation Value for the First Subbound Satisfies the Inequality Condition with respect to the Measurement Value Associated with the First Subcone
782

*FIG. 21*

VISIBLE-OBJECT DETERMINATION FOR INTERACTIVE VISUALIZATION

PRIORITY CLAIM

This application claims benefit of priority of U.S. provisional application Ser. No. 60/074,868 titled "Visible-Object Determination for Interactive Visualization" filed Feb. 17, 1998, whose inventors were Henry Sowizral and Karel Zikan.

FIELD OF THE INVENTION

The present invention relates generally to the field of computer graphics, and more particularly, to the problem of determining the set of objects/surfaces visible from a defined viewpoint in a graphics environment.

BACKGROUND OF THE INVENTION

Visualization software has proven to be very useful in evaluating three-dimensional designs long before the physical realization of those designs. In addition, visualization software has shown its cost effectiveness by allowing engineering companies to find design problems early in the design cycle, thus saving them significant amounts of money. Unfortunately, the need to view more and more complex scenes has outpaced the ability of graphics hardware systems to display them at reasonable frame rates. As scene complexity grows, visualization software designers need to carefully use the rendering resource provided by graphic hardware pipelines.

A hardware pipeline wastes rendering bandwidth when it discards triangle work. Rendering bandwidth waste can be decreased by not asking the pipeline to draw triangles that it will discard. Various software methods for reducing pipeline waste have evolved over time. Each technique reduces waste at a different point within the pipeline. As examples, software frustum culling can significantly reduce discards in a pipeline's clipping computation while software backface culling can reduce discards in a pipeline's lighting computation.

The z-buffer is the final part of the graphics pipeline that discards work. In essence, the z-buffer retains visible surfaces and discards those not visible. As scene complexity increases, especially in walk through and CAD environments, the number of occluded surfaces rises rapidly and as a result the number of surfaces that the z-buffer discards rises as well. A frame's average depth complexity determines roughly how much work (and thus rendering bandwidth) the z-buffer discards. In a frame with a per-pixel depth complexity of d the pipeline's effectiveness is 1/d. As depth complexity rises, the hardware pipeline thus becomes proportionally less and less effective.

Software occlusion culling has been proposed as an additional tool for improving rendering effectiveness. A visualization program which performs occlusion culling effectively increases the graphic hardware's overall rendering bandwidth by not asking the hardware pipeline to draw occluded objects. Computing a scene's visible objects is the complementary problem to that of occlusion culling. Rather than removing occluded objects from the set of objects in a scene or even a frustum culled scene, a program instead computes which objects are visible and draws just those. A simple visualization program can compute the set of visible objects and draw those objects from the current viewpoint, allowing the pipeline to remove backfacing polygons and the z-buffer to remove any non-visible surfaces.

One technique for computing the visible object set uses ray casting. RealEyes [Sowizral, H. A., Zikan, K., Esposito, C., Janin, A., Mizell, D. "*RealEyes: A System for Visualizing Very Large Physical Structures*", SIGGRAPH '94, Visual Proceedings, 1994, p. 228], a system that implemented the ray casting technique, was demonstrated in SIGGRAPH 1994's BOOM room. At interactive rates, visitors could "walk" around the interior of a Boeing 747 or explore the structures comprising Space Station Freedom's lab module.

The intuition for the use of rays in determining visibility relies on the properties of light. The first object encountered along a ray is visible since it alone can reflect light into the viewer's eye. Also, that object interposes itself between the viewer and all succeeding objects along the ray making them not visible. In the discrete world of computer graphics, it is difficult to propagate a continuum of rays. So a discrete subset of rays is invariably used. Of course, this implies that visible objects or segments of objects smaller than the resolution of the ray sample may be missed and not discovered. This is because rays guarantee correct determination of visible objects only up to the density of the ray-sample. FIG. 1 illustrates the ray-based method of visible object detection. Rays that interact with one or more objects are marked with a dot at the point of their first contact with an object. It is this point of first contact that determines the value of the screen pixel corresponding to the ray. Also observe that the object denoted A is small enough to be entirely missed by the given ray sample.

Visible-object determination has its roots in visible-surface determination. Foley et al. [Foley, J., van Dam, A., Feiner, S. and Hughes, J. *Computer Graphics: Principles and Practice*, 2nd ed., Addison-Wesley, Chapter 15, pp.649–718, 1996] divide visible-surface determination approaches into two broad groups: image-precision and object-precision algorithms. Image precision algorithms typically operate at the resolution of the display device and tend to have superior performance computationally. Object precision approaches operate in object space—usually performing object to object comparisons.

A prototypical image-precision visible-surface-determination algorithm casts rays from the viewpoint through the center of each display pixel to determine the nearest visible surface along each ray. The list of applications of visible-surface ray casting (or ray tracing) is long and distinguished. Appel ["Some Techniques for Shading Machine Rendering of Solids", SJCC'68, pp. 37–45, 1968] uses ray casting for shading. Goldstein and Nagel [Mathematical Applications Group, Inc., "3-D Simulated Graphics Offered by Service Bureau," *Datamation*, 13(1), February 1968, p. 69.; see also Goldstein, R. A. and Nagel, R. "3-D Visual Simulation", Simulation, 16(1), pp.25–31, 1971] use ray casting for boolean set operations. Kay et al. [Kay, D. S. and Greenberg, D., "Transparency for Computer Synthesized Images," SIGGRAPH'79, pp.158–164] and Whitted ["An Improved Illumination Model for Shaded Display", CACM, 23(6). pp.343–349, 1980] use ray tracing for refraction and specular reflection computations. Airey et al. [Airey, J. M., Rohlf, J. H. and Brooks, Jr. F. P. Towards Image Realism with Interactive Update Rates in Complex Virtual Building Environments. ACM SIGGRAPH *Symposium on Interactive 3 D Graphics*, 24, 2(1990), pp. 41–50] uses ray casting for computing the portion of a model visible from a given cell.

Another approach to visible-surface determination relies on sending beams or cones into a database of surfaces [see Dadoun et al., "Hierarchical approachs to hidden surface intersection testing." *Proceeedings of Graphics Interface*

'82, Toronto, May 1982, 49–56; see also Dadoun et al., "The geometry of beam tracing." In Joseph O'Rourke, ed., *Proceeedings of the Symposium on Computational Geometry*, pp.55–61, ACM Press, New York, 1985]. Essentially, beams become a replacement for rays. The approach usually results in compact beams decomposing into a set of possibly non-connected cone(s) after interacting with an object.

A variety of spatial subdivision schemes have been used to impose a spatial structure on the objects in a scene. [The following four references pertain to spatial subdivision schemes: (a) Glassner, "Space subdivision for fast ray tracing," IEEE CG&A, 4(10):15–22, October 1984; (b) Jevans et al., "Adaptive voxel subdivision for ray tracing," Proceedings Graphics Interface '89, 164–172, June 1989; (c) Kaplan, M. "The use of spatial coherence in ray tracing," in *Techniques for Computer Graphics . . . ,* Rogers, D. and Earnshaw, R. A. (eds), Springer-Verlag, New York, 1987; and (d) Rubin, S. M. and Whitted, T. "A 3-dimensional representation for fast rendering of complex scenes," *Computer Graphics,* 14(3):110–116, July 1980.]

Kay et al. [Kay, T. L. and Kajiya, J. T. "Ray Tracing Complex Scenes", SIGGRAPH 1986, pp. 269–278,1986], concentrating on the computational aspect of ray casting, employed a hierarchy of spatial bounding volumes in conjunction with rays, to determine the visible objects along each ray. Of course, the spatial hierarchy needs to be precomputed. However, once in place, such a hierarchy facilitates a recursive computation for finding objects. If the environment is stationary, the same data-structure facilitates finding the visible object along any ray from any origin.

Teller et al. [Teller, S. and Sequin, C. H. "Visibility Preprocessing for Interactive Walkthroughs," SIGGRAPH '91, pp.61–69] use preprocessing to full advantage in visible-object computation by precomputing cell-to-cell visibility. Their approach is essentially an object precision approach and they report over 6 hours of preprocessing time to calculate 58 Mbytes of visibility information for a 250,000 polygon model on a 50 MIP machine [Teller, S. and Sequin. C. H. "Visibility computations in polyhedral three-dimensional environments," U.C. Berkeley Report No. UCB/CSD 92/680, April 1992].

In a different approach to visibility computation, Greene et al. [Greene, N., Kass, M., and Miller, G. "Hierarchical z-Buffer Visibility," *SIGGRAPH* '93, pp.231–238] use a variety of hierarchical data structures to help exploit the spatial structure inherent in object space (an octree of objects), the image structure inherent in pixels (a Z pyramid), and the temporal structure inherent in frame-by-frame rendering (a list of previously visible octree nodes). The Z-pyramid permits the rapid culling of large portions of the model by testing for visibility using a rapid scan conversion of the cubes in the octree.

The depth complexity of graphical environments continues to increase in response to consumer demand for realism and performance. Thus, the efficiency of an algorithm for visible object determination has a direct impact on the marketability of a visualization system. The computational bandwidth required by the visible object determination algorithm determines the class of processor required for the visualization system, and thereby effects overall system cost. Thus, a system or method for improving the efficiency of visible object determination is greatly desired.

SUMMARY OF THE PRESENT INVENTION

The present invention comprises a system and method for displaying visible objects in a graphics environment. In particular, a system and method for performing visible object determination based upon a dual search of a cone hierarchy and a bounding hierarchy is herein disclosed. The system includes a processor, a display device, system memory, and optionally a graphics accelerator. The processor executes visualization software which provides for visualization of a collection of three-dimensional objects on the display device. The objects reside in a three-dimensional space and thus admit the possibility of occluding one another.

The visualization software represents space in terms of a hierarchy of cones emanating from the viewpoint. In one embodiment, the leaf-cones of the hierarchy, i.e. the cones at the highest level of refinement, subtend an area which corresponds to a fraction of a pixel in screen area. For example, two cones may conveniently fill the area of a pixel. Alternatively, the leaf-cone may subtend areas which include one or more pixels.

An initial view frustum or neighborhood of the view frustum is recursively tessellated (i.e. refined) to generate a cone hierarchy. Alternatively, the entire space around the viewpoint may be recursively tessellated to generate the cone hierarchy. In this case, the cone hierarchy does not need to be recomputed for changes in the viewpoint and view-direction.

The visualization software also generates a hierarchy of bounds from the collection of objects. In particular, the bounding hierarchy is generated by: (a) recursively grouping clusters starting with the objects themselves as order-zero clusters, (b) bounding each object and cluster (of all orders) with a corresponding bound, e.g. a polytope hull, (c) allocating a node in the bounding hierarchy for each object and cluster, and (d) organizing the nodes in the bounding hierarchy to reflect cluster membership. For example if node A is the parent of node B, the cluster corresponding to node A contains a subcluster (or object) corresponding to node B. Each node stores parameters which characterize the bound of the corresponding cluster or object.

The visualization software performs a search of the cone and bounding hierarchies starting with the root cone and the root bound. Each leaf-cone is assigned a visibility distance value which represents the distance to the closest known object as perceived from within the leaf-cone. Each leaf-cone is also assigned an object attribute which specifies the closest known object within view of the leaf-cone. Similarly, each non-leaf cone is assigned a visibility distance value. However, the visibility distance value of a non-leaf cone is set equal to the maximum of the visibility distance values for its subcone children. This implies that the visibility distance value for each non-leaf cone equals the maximum of the visibility distance values of its leaf-cone descendents.

The visibility software operates on cone-bound pairs. Before exploring a given cone-bound pair, the distance between the cone and the bound is measured. This involves determining the minimum distance to points residing in both the bound and the cone from the vertex of the cone. This cone-bound distance is then compared to the visibility distance value of the cone. If the cone-bound distance is larger than the visibility distance value of the cone, all of the leaf-cone descendents of the given cone have known visible objects closer than the given bound by definition of the visibility distance value. Thus, no benefit can be gained from exploring the cone-bound pair. In contrast, if the cone-bound distance is smaller than the visibility distance value of the cone, the bound may contain objects which will affect the visibility distance values of one or more leaf-cone descendents of the given cone. The cone-bound pair must be searched. According to the present invention, cone-bound pairs are advantageously searched only when there is a possibility that the given bound may affect the visibility of the cone's descendents. Thus, the search algorithm of the present invention avoids unnecessary cone-bound explorations and thereby saves considerable computational bandwidth.

Supposing that the search condition is satisfied, the bound is explored with respect to the given cone. If the cone and bound are both leaves of their respective hierarchies, the bound specifies an object which is closer than the closest known object for the leaf-cone. Thus, the visibility distance value of the leaf-cone is updated with the cone-bound distance between the cone and bound. Also, the object attribute for the cone is updated to point to the given bound.

In the case that the cone is a leaf-cone and the bound is a non-leaf bound, the search algorithm examines subbounds of the given bound, and conditionally explores these subbounds in ascending order of their cone-bound distance from the given cone. Again, exploration of a subbound is conditioned upon the subbound achieving a cone-bound distance to the given cone which is smaller than the cone's visibility distance value.

In the case that the cone is a non-leaf cone and the bound is a leaf bound (i.e. one which bounds a single object), the search algorithm conditionally explores subcones of the given cone with respect to the given bound. Exploration of a subcone is conditioned upon the subcone achieving a cone-bound distance to the given bound which is smaller than the subcone's visibility distance value.

In the case that the cone is a non-leaf cone and the bound is a non-leaf bound, the search algorithm conditionally explores subbounds of the given bound against the subcones of the given cone. Consider a particular subcone of the given cone for the sake of discussion. The subbounds of the given bound are conditionally explored against the subcone in ascending order of their cone-bound distances from the subcone. Because the closest subbound is searched first, and potentially decreases the visibility distance value of the given subcone, succeeding (more distant) subbounds will have more difficulty passing the search condition, i.e. of having a cone-bound distance to the given subcone which is less than the visibility distance value of the subcone. Thus, the probability is maximized that the fewest number of subbounds will need to be explored by ordering the conditional explorations according to cone-bound distance.

When the search of the two trees is completed, the object attribute of each leaf-cone points to the object which is visible to the leaf-cone, and the visibility distance value of the leaf-cone specifies the distance to the visible object. This visibility information is provided to the graphics accelerator so that the graphics accelerator may render the visible objects (or visible portions of visible object) on the display device.

In one embodiment, the visualization software provides for interactive visualization by reading user inputs to control the current viewpoint and view-direction in the graphics environment. Additional software ensures efficient computation through the use of careful state management and parallelism.

In one alternative embodiment, the cone hierarchy and bounding hierarchy are searched iteratively. In a second alternative embodiment, a level order search is performed on the cone hierarchy and the bounding hierarchy.

The present invention contemplates a wide variety of techniques for measuring the extent of separation or proximity between a bound and a cone. One set of embodiments focus of minimizing an increasing function of separation distance between the vertex of the cone and points in the intersection of the cone and the bound. Another set of embodiments involve maximizing a decreasing function of separation distance between the vertex of the cone and points in the intersection of the cone and the bound. In general, any wavefront with a boundary that obeys a mild "star shape" condition may provide the basis for a measurement of separation between a bound and a cone.

BRIEF DESCRIPTION OF THE FIGURES

FIG. 4A illustrates a collection of objects in a graphics environment;

FIG. 4B illustrates a first step in the first formation of a hull hierarchy, i.e. the step of bounding objects with containing hulls and allocating hull nodes for the containing hulls;

FIG. 4C illustrates the process of grouping together hulls to form higher order hulls, and allocating nodes in the hull hierarchy which correspond to the higher order hulls;

FIG. 4D illustrates the culmination of the recursive grouping process wherein all objects are contained in a universal containing hull which corresponds to the root node of the hull hierarhcy;

FIG. 16 further elaborates step 722 of FIG. 15, i.e. the step of conditionally searching the subbounds of the first bound with respect to the first cone, by means of a generic subbound as an example;

FIG. 17 illustrates the processing steps to be performed when the visibility search arrives at a terminal bound and a non-terminal cone;

FIG. 18 further elaborates step 742 of FIG. 17, i.e. the step of conditionally searching subcones of the first cone with respect to the first bound, by means of a generic subcone example;

FIG. 19 illustrates the processing steps to be performed when the visibility search arrives at a non-terminal bound and a non-terminal cone;

FIG. 20 further elaborates step 762 of FIG. 19, i.e. the step of conditionally exploring subbounds of the first bound with respect to the first subcone; and FIG. 21 further elaborates step 772 of FIG. 20, i.e. the step of conditionally searching the subbounds of the first bound with respect to the first subcone, by means of a generic subhull example.

DETAILED DESCRIPTION OF THE PREFERRED EMBODIMENT

Figure 1:
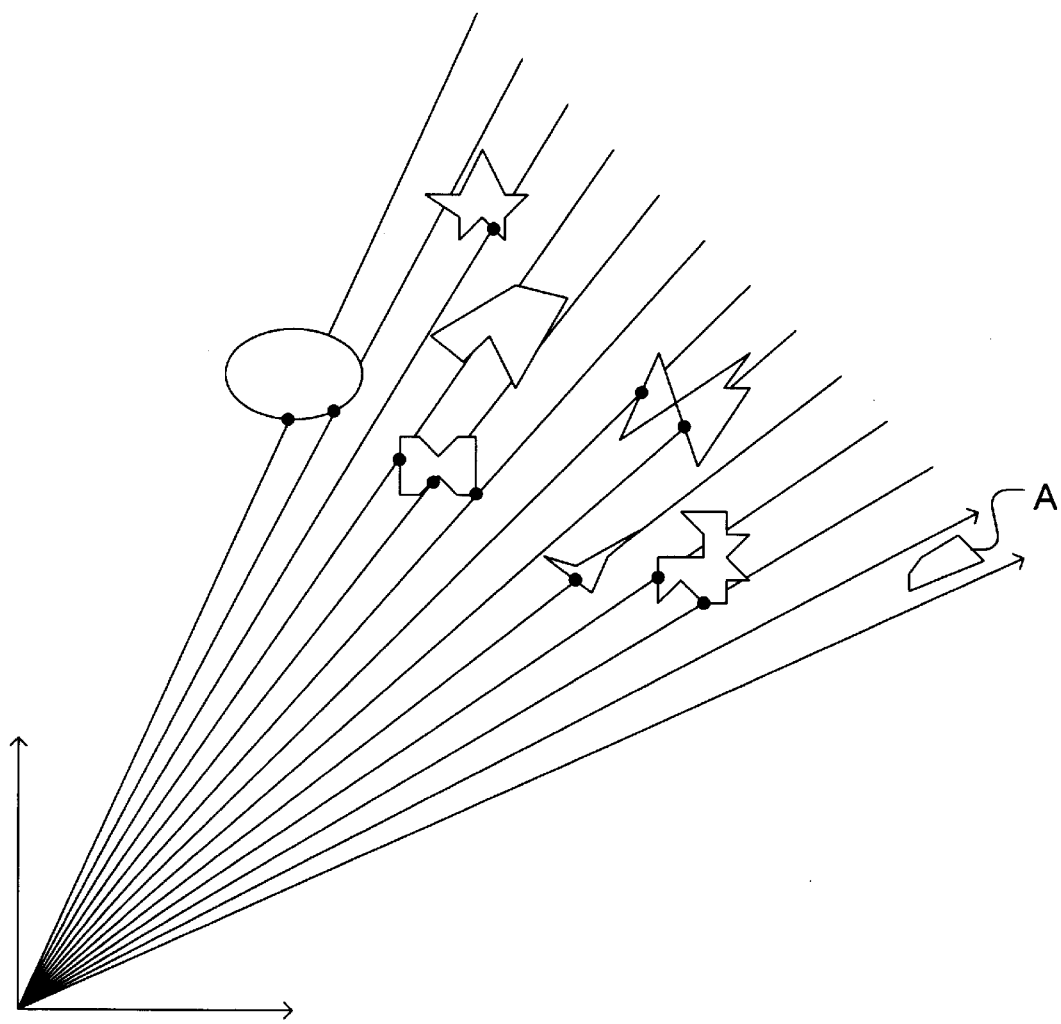
FIG. 1 illustrates the ray-based method of visible object detection according to the prior art.
Figure 2A:
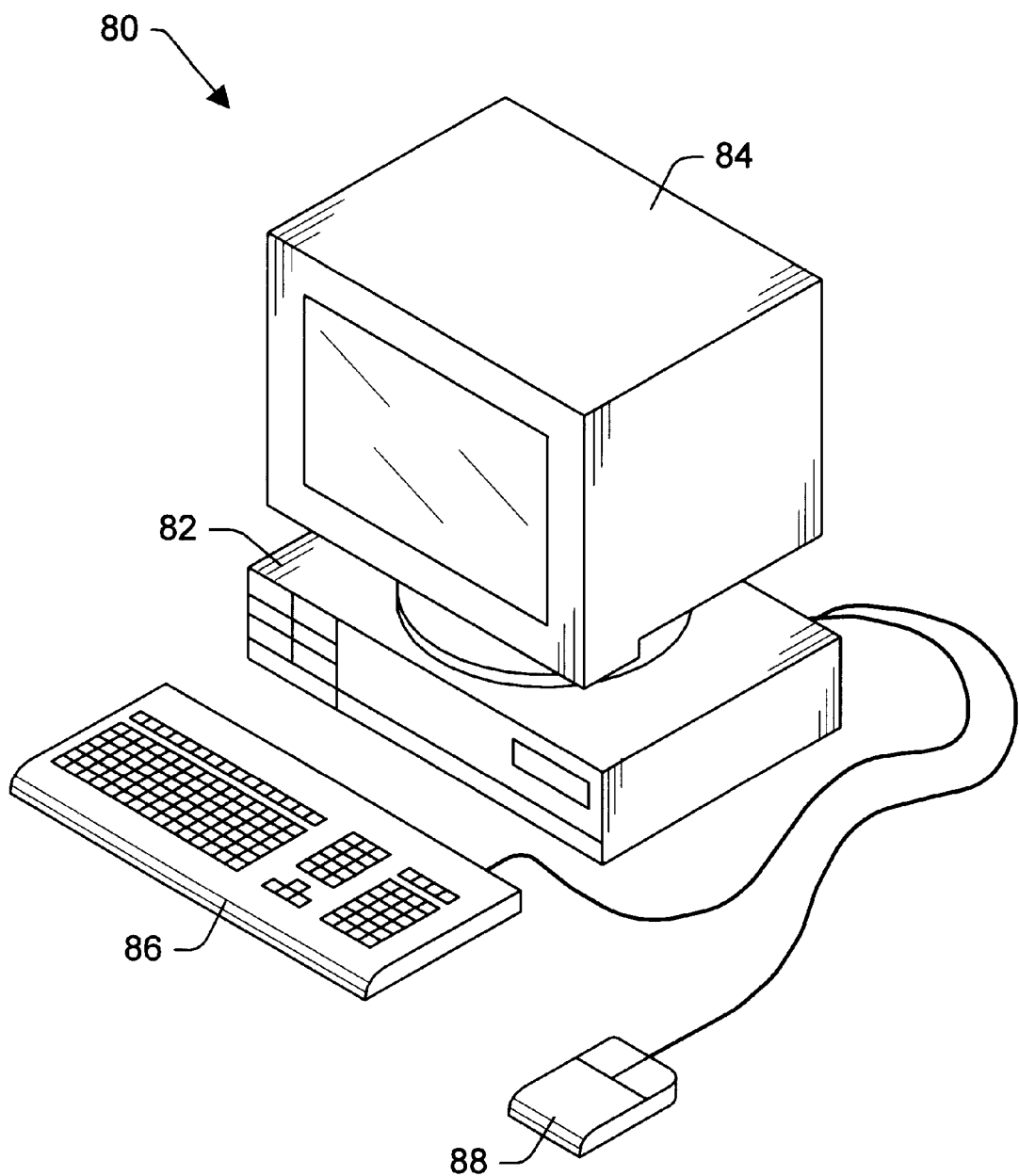
FIG. 2A illustrates a graphical computing system according to the present invention.

FIG. 2A presents a graphical computing system 80 according to the preferred embodiment of the present invention. Graphical computing system 80 comprises a system unit 82, and a display device 84 coupled to the system unit 82. The display device 84 may be realized by any various types of video monitors or graphical displays. Graphics computer system 80 also includes a keyboard 86 and preferably a mouse 88.

Figure 2B:
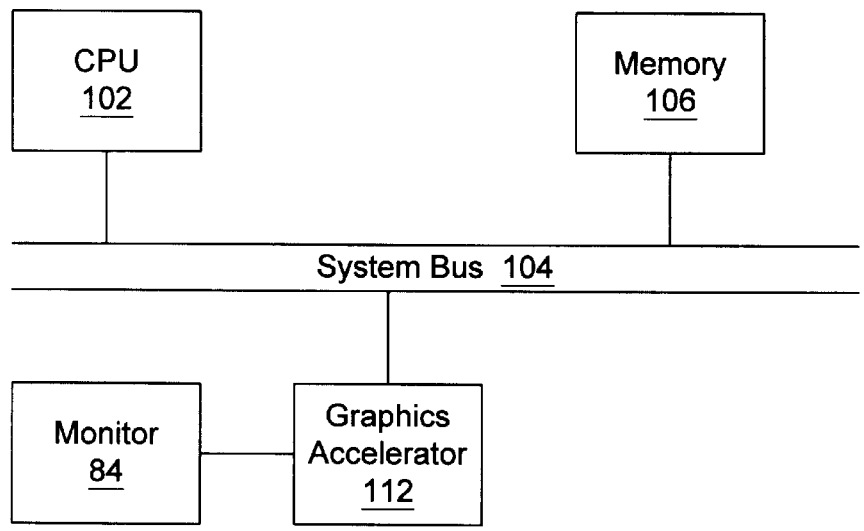
FIG. 2B is a block diagram illustrating one embodiment of the graphical computing system of the present invention.

FIG. 2B is a block diagram illustrating one embodiment of graphical computing system 80. As shown, graphical computing system 80 includes a host central processing unit (CPU) 102 coupled to a high speed bus or system bus 104. A system memory 106 is also preferably coupled to system bus 104. The system memory 106 may include any of various types of memory subsystems including random access memory, read only memory, and/or mass storage devices. The host processor 102 executes a visualization software program which determines the set of visible objects in a scene. The visualization software program is stored in system memory 106. In an alternative embodiment, the visualization software program executes on a processor comprised within graphics accelerator 112.

An optional 3-D graphics accelerator 112 may be coupled to system bus 104. If 3D accelerator 112 is not included in graphical computing system 80, then display device 84 may couple directly to system bus 104. It is assumed that various other peripheral devices, or other buses, may be connected to system bus 104, as is well known in the art. Display device 84 couples to 3-D graphics accelerator 112. CPU 102 may transfer information to and from the graphics accelerator 112 according to a programmed input/output (I/O) protocol over the system bus 104. Furthermore, the graphics accelerator 112 may access system memory 106 according to a direct memory access (DMA) protocol or through intelligent bus mastering.

3-D graphics accelerator 112 is a specialized graphics rendering subsystem which is designed to off-load the 3-D rendering functions from the host processor, thus providing improved system performance. In a system with a 3-D graphics accelerator, a graphics application program executing on the host processor 102 generates three-dimensional geometry data that defines three-dimensional graphics elements for output on a display device 84. The application program transfers the geometry data to the graphics accelerator 112. The graphics accelerator 112 receives the geometry data and renders the corresponding graphics elements on the display device. A fundamental goal of computer graphics is to render objects that are realistic to the user. The problem of visual realism, however, is quite complex. Objects in the "real world" include an incredible amount of detail, including subtle variations in color, reflections, and surface irregularities. Applications which display three-dimensional graphics require a tremendous amount of processing bandwidth. For example, for a computer system to generate smooth 3-D motion video, the computer system is required to maintain a frame rate or update rate of between 20 to 30 frames per second. This typically requires a 3-D graphics accelerator capable of processing over a million triangles per second.

The computer system 80 includes visualization software according to the present invention. The visualization software is preferably executed by the host processor 102, or alternatively may be executed by a processor comprised on the graphics accelerator 112.

Visualization Software Architecture

Figure 3:
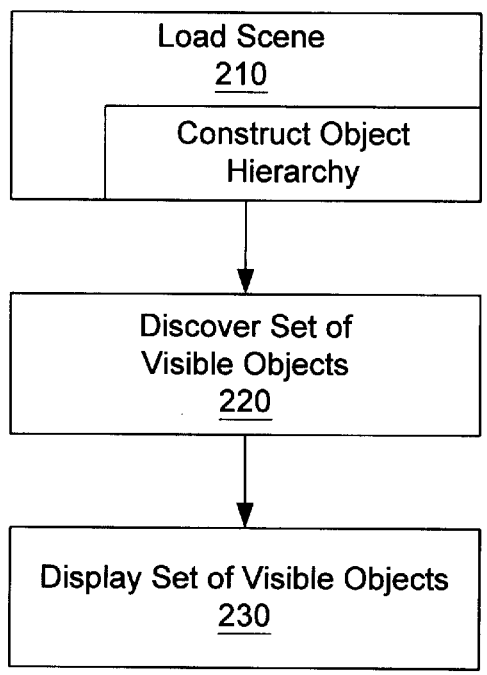
FIG. 3 illustrates several main phases of visualization software according to the present invention.

As illustrated in FIG. 3, the visualization software of the present invention comprises three main phases. In an initial step 210, the visualization software loads a scene. The scene includes a plurality of objects. Scene loading includes constructing an object hierarchy—if it has not already been constructed. In step 220 the visualization software discovers the set of visible objects in the scene with respect to a current viewpoint. In the preferred embodiment, the visualization software is designed to compute visibility for three-dimensional objects from a view point in a three-dimensional coordinate space. However, the methodologies herein described naturally generalize to spaces of arbitrary dimension.

In one embodiment of the visualization software, the viewpoint in the graphical environment may be changed by user input. For example, by manipulating the mouse 88 and/or depressing keys on keyboard 86, the user may cause the viewpoint and view orientation to change. Thus, the visualization software preferably recomputes the set of visible objects whenever the viewpoint or view orientation changes.

In step 230 the visualization software in conjunction with graphics accelerator 112 displays the visible objects, i.e. commands the graphics accelerator to 112 to render those objects in the display screen. By performing visible object determination in software on the host computer, the graphics accelerator 112 may operate with greatly increased efficiency. Thereby, the overall processing capacity of the graphics system 80 is improved. Discovery and display of the visible-object-set occur repeatedly as the viewpoint or view direction (i.e. orientation) changes. The discovery and display steps are preferably performed as concurrent processes. However, in an alternative embodiment, they are performed sequentially.

Unless otherwise stated, it is assumed that all objects in the model are opaque convex polytopes. A three-dimensional solid is said to be convex if any two points in the solid (or on the surface of the solid) may be connected with a line segment which resides entirely within the solid. Thus a solid cube is convex, while a donut is not. A polytope is an object with planar sides (e.g. cube, tetrahedron, etc.). The methodologies described herein for opaque objects naturally extend to transparent or semi-transparent objects by not allowing such objects to terminate a cone computation. The convexity assumption presents more of a problem. However, every object can be approximated as a union of convex polytopes. It is helpful to note that the visible-object-set computation does not require an exact computation, but rather a conservative one. In other words, it is permissible to over-estimate the set of visible objects.

Constructing the Object Hierarchy

Initially, the objects in the scene are organized into a hierarchy that groups objects spatially. An octree is one possibility for generating the object hierarchy. However, in the preferred embodiment, a clustering algorithm is used which groups nearby objects then recursively clusters pairs of groups into larger containing spaces. The clustering algorithm employs a simple distance measure and thresholding operation to achieve the object clustering. FIGS. 4A–4D illustrate the clustering process for a collection of four objects J00 through J11. The objects are indexed in a fashion which anticipates their ultimate position in a binary tree of object groups. The objects are depicted as polygons situated in a plane (see FIG. 4A). However, the reader should imagine these objects as arbitrary three-dimensional objects. In one embodiment, the objects are three-dimensional polytopes.

Each object is bounded, i.e. enclosed, by a corresponding bounding surface referred to herein as a bound. In the preferred embodiment, the bound for each object is a polytope hull (i.e. a hull having planar faces) as shown in FIG. 4B. The hulls H00 through H11 are given labels which are consistent with the objects they bound. For example, hull H00 bounds object J00. The hulls are illustrated as rectangles with sides parallel to a pair of coordinate axes. These hulls are intended to represent rectangular boxes (parallelepipeds) in three dimensions whose sides are normal to a fixed set of coordinate axes. For each hull a corresponding node data structure is generated. The node stores parameters which characterize the corresponding hull.

Figure 5A:
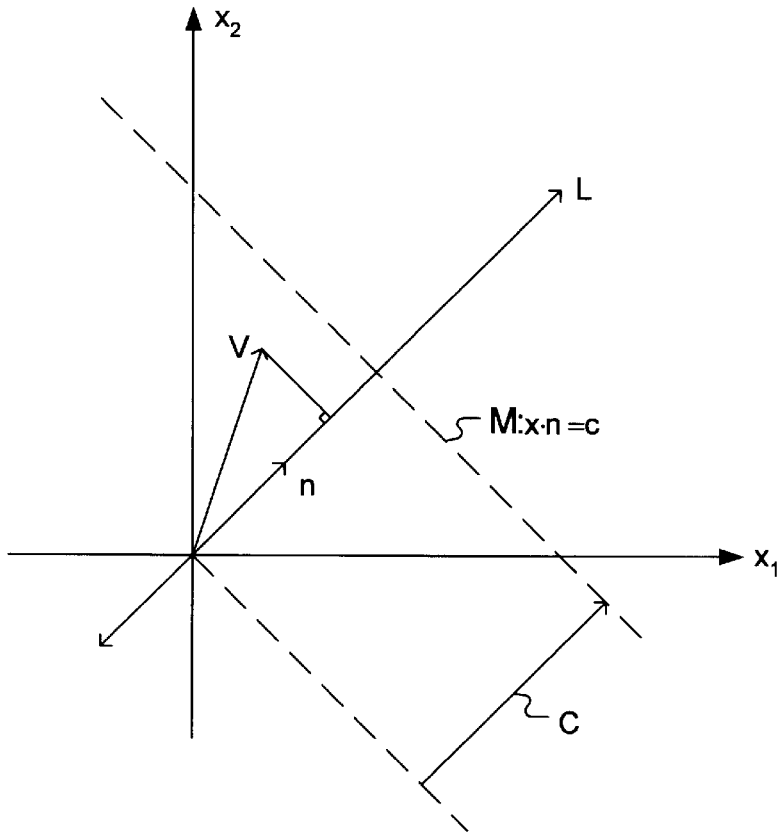
FIG. 5A illustrates the mathematical expressions which describe lines and half-planes in two dimensional space.

Since a hull has a surface which is comprised of a finite number of planar components, the description of a hull is intimately connected to the description of a plane in three-space. In FIG. 5A, a two dimensional example is given from which the equation of an arbitrary plane may be generalized. A unit vector n [any vector suffices but a vector of length one is convenient for discussion] defines a line L through the origin of the two dimensional space. By taking the dot product of a vector v with the unit vector n, denoted v·n, one obtains the length of the projection of vector v in the direction defined by unit vector n. Thus, given a real constant c it follows that the equation $x \cdot n = c$, where x is a vector variable, defines a line M perpendicular to line L and situated at a distance c from the origin along line L. In the context of three-dimensional space, this same equation defines a plane perpendicular to the line L, again displaced distance c from the origin along line L. Observe that the constant c may be negative, in which case the line (or plane) M is displaced from the origin distance |c| along line L in the direction opposite to unit vector n.

The line $x \cdot n = c$ divides the plane into two half-planes. By replacing the equality in the above equation with an inequality, one obtains the description of one of these half-planes. The equality $x \cdot n < c$ defines the half-plane which contains the negative infinity end of line L. [The unit vector n defines the positive direction of line L.] In three dimensions, the plane $x \cdot n = c$ divides the three-dimensional space into two half-spaces. The inequality $x \cdot n < c$ defines the half-space which contains the negative infinity end of line L.

Figure 5B:
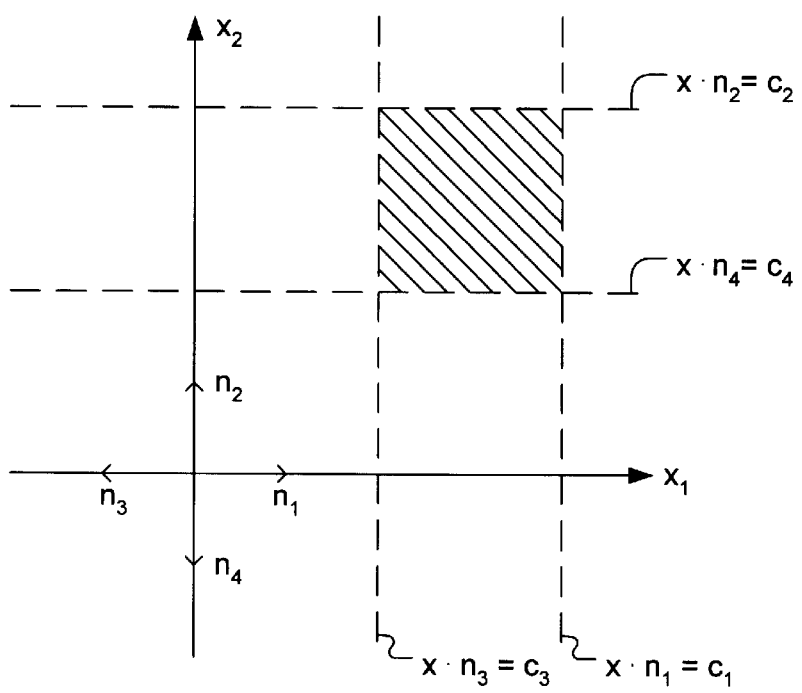
FIG. 5B illustrates the description of a rectangular region as the intersection of four half-planes in a two dimensional space.

FIG. 5B shows how a rectangular region may be defined as the intersection of four half-planes. Given four normal vectors $n_1$ through $n_4$, and four corresponding constants $c_1$ through $c_4$, a rectangular region is defined as the set of points which simultaneously satisfy the set of inequalities $x \cdot n_i < c_i$, where i ranges from one to four. This system of inequalities may be summarized by the matrix-vector expression $N \cdot x < c$, where the rows are matrix N are the normal vectors $n_1$ through $n_4$, and the components of vector c are the corresponding constants $c_1$ through $c_4$. If the normal vectors are chosen so as to lie in the positive and negative axial directions (as shown in FIG. 5B), the resulting rectangular region has sides parallel to the axes. It is noted that the rectangular hulls H00 through H11 shown in FIG. 4B all use a common set of normal vectors. Thus, each hull is characterized by its unique c vector.

In three-dimensional space, a rectangular box may be analogously defined as the intersection of six half-spaces. Given six normal vectors $n_1$ through $n_6$, oriented in each of the three positive and three negative axial directions, and six corresponding constants $c_1$ through $c_6$, the simultaneous solution of the inequalities $x \cdot N_i < c_i$, where i runs from one to six, defines a rectangular box with sides parallel to the coordinate planes. Thus, a rectangular box may be compactly represented with the same matrix-vector expression $Nx < c$, where matrix N now has six rows for the six normal vectors, and vector c has six elements for the six corresponding constants.

To construct an object hierarchy, object hulls H00 through H11 are paired together as shown in FIG. 4C. Each pair of object hulls is bounded by a containing hull. For example, hulls H00 and H01 are paired together and bounded by containing hull H0. Containing-hull H0 efficiently contains the two component hulls H00 and H01. Likewise, object hulls H10 and H11 are paired together and bounded by containing-hull H1. In addition, two parent nodes are generated in the object hierarchy, one for each of the containing-hulls H0 and H1. For simplicity, the parent nodes are commonly labeled as their corresponding containing-hulls. Thus, parent node H0 points to its children nodes H00 and H01, while parent node H1 points to its children nodes H10 and H11. Each parent node contains the characterizing c vector for the corresponding containing-hull.

The containing-hulls H0 and H1 may be referred to as first order containing-hulls since they are the result of a first pairing operation on the original object hulls. A second pairing operation is applied to the first-order containing hulls to obtain second-order containing-hulls. Each second-order containing-hull efficiently contains two first-order hulls. For each of the second-order containing-hulls a parent node is generated in the object hierarchy. The parent node reflects the same parent-child relationship as the corresponding second-order containing-hull. For example, in FIG. 4D, second-order containing-hull H efficiently contains first-order containing-hulls H0 and H1. Thus, parent node H in the object hierarchy points to children nodes H0 and H1. Parent node H stores the characterizing vector c for the containing-hull H. In the example presented in FIGS. 4A–4D, the object hierarchy is complete after two pairing operations since the original object collections contained only four objects.

In general, a succession of pairing operations is performed. At each stage, a higher-order set of containing-hulls and corresponding nodes for the object hierarchy are generated. Each node contains the describing vector c for the corresponding containing-hull. At the end of the process, the object hierarchy comprises a binary tree with a single root node. The root node corresponds to a total containing-hull which contains all sub-hulls of all orders including all the original object-hulls. The object hierarchy, because it comprises a hierarchy of bounding hulls, will also be referred to as the hull hierarchy. In the preferred embodiment, the pairing operations are based on proximity, i.e. objects (and hulls of the same order) are paired based on proximity. Proximity based pairing results in a more efficient visible object determination algorithm. This tree of containing hulls provides us with a computationally efficient, hierarchical representation of the entire scene. For instance, when a cone completely misses a node's containing-hull, none of the node's descendents need to be examined.

Bounding hulls (i.e. containing hulls) serve the purpose of simplifying and approximating objects. Any hierarchy of containing hulls works in principle. However, hierarchies of hulls based on a common set of normal vectors are particularly efficient computationally. A collection of hulls based on a common set of normal vectors will be referred to herein as a fixed-direction or commonly-generated collection. As described above, a polytope hull is described by a bounding system of linear inequalities $\{x:Nx \leq c\}$, where the rows of the matrix N are a set of normal vectors, and the elements of the vector c define the distances to move along each of the normal vectors to obtain a corresponding side of the polytope. In a fixed-direction collection of hulls, the normal matrix N is common to all the hulls in the collection, while the vector c is unique for each hull in the collection. The problem of calculating the coefficient vector c for a containing hull given a collection of subhulls is greatly simplified when a common set of normal vectors is used. In addition, the nodes of the hull hierarchy may advantageously consume less memory space since the normal matrix N need not be stored in the nodes. In the preferred embodiment of the invention, the hull hierarchy comprises a fixed-direction collection of hulls.

In a first embodiment, six normal vectors oriented in the three positive and three negative axial directions are used to generate a fixed-direction hierarchy of hulls shaped like rectangular boxes with sides parallel to the coordinate planes. These axis-aligned bounding hulls provide a simple representation that has excellent local computational properties. It is easy to transform or compare two axis-aligned hulls. However, the approximation provided by axis-aligned hulls tends to be rather coarse, often proving costly at more global levels.

In a second embodiment, eight normal vectors directed towards the corners of a cube are used to generate a hierarchy of eight-sided hulls. For example, the eight vectors $(\pm 1, \pm 1, \pm 1)$ may be used to generate the eight-sided hulls. The octahedron is a special case of this hull family.

In a third embodiment, fourteen normal vectors, i.e. the six normals which generate the rectangular boxes plus the eight normals which generate the eight-sided boxes, are used to generate a hull hierarchy with fourteen-sided hulls. These fourteen-sided hulls may be described as rectangular boxes with corners shaved off. It is noted that as the number of normal vectors and therefore side increases, the accuracy of the hull's approximation to the underlying object increases.

In a fourth embodiment, twelve more normals are added to the fourteen normals just described to obtain a set of twenty-six normal vectors. The twelve additional normals serve to shave off the twelve edges of the rectangular box in addition to the corners which have already been shaved off. This results in twenty-six sided hulls. For example, the twelve normal vectors $(\pm 1, \pm 1, 0)$, $(\pm 1, 0, \pm 1)$, and $(0, \pm 1, \pm 1)$ may be used as the additional vectors.

In the examples given above, hulls are recursively grouped in pairs to generate a binary tree. However, in other embodiments, hulls are grouped together in groups of size G, where G is larger than two. In one embodiment, the group size varies from group to group. This may be particularly advantageous for scenes which have non-uniform object density. For example, if a large number of small objects are clustered in a scene, it may be advantageous to include these in a single group, i.e. bound them with a single containing hull. Larger objects may be assembled into groups with fewer members.

Although the above discussion has focussed on the use of polytope hulls as bounds for object and clusters, it is noted that any type of bounding surfaces may be used, thereby generating a hierarchy of bounds referred to herein as a bounding hierarchy. Each node of the bounding hierarchy corresponds to an object or cluster and stores parameters which characterize the corresponding bound for that object or cluster. For example, polynomial surfaces such as quadratic surfaces may be used to generate bounds for objects and/or clusters. Spheres and ellipsoids are examples of quadratic surfaces.

Cones in Visible Object Determination

In addition to the bounding hierarchy (e.g. hull hierarchy) discussed above, the present invention makes use of a hierarchy of spatial cones. An initial cone which represents the view frustum is recursively subdivided into a hierarchy of sub-cones. Then a simultaneous double recursion is performed through the pair of trees (the object tree and cone tree) to rapidly determine the set of visible objects. This cone-based method provides a substantial computational gain over the prior art method based on ray-casting. This is partially due to the fact that the ray-casting methods require multiple unrelated visibility queries to cover a region equivalent to a cone.

Cones discretize the spatial continuum differently than rays. Consider the simultaneous propagation of all possible rays from a point and the ensuing spherical wavefront. The first object encountered by each ray is visible. If consideration is restricted to those rays that form a cone, the same observation still applies. The first object encountered by the cone's wavefront is visible. Now, if the view frustum is partitioned into some number of cones, the objects visible from the viewpoint can be determined up to the resolution of the cones.

Figure 6:
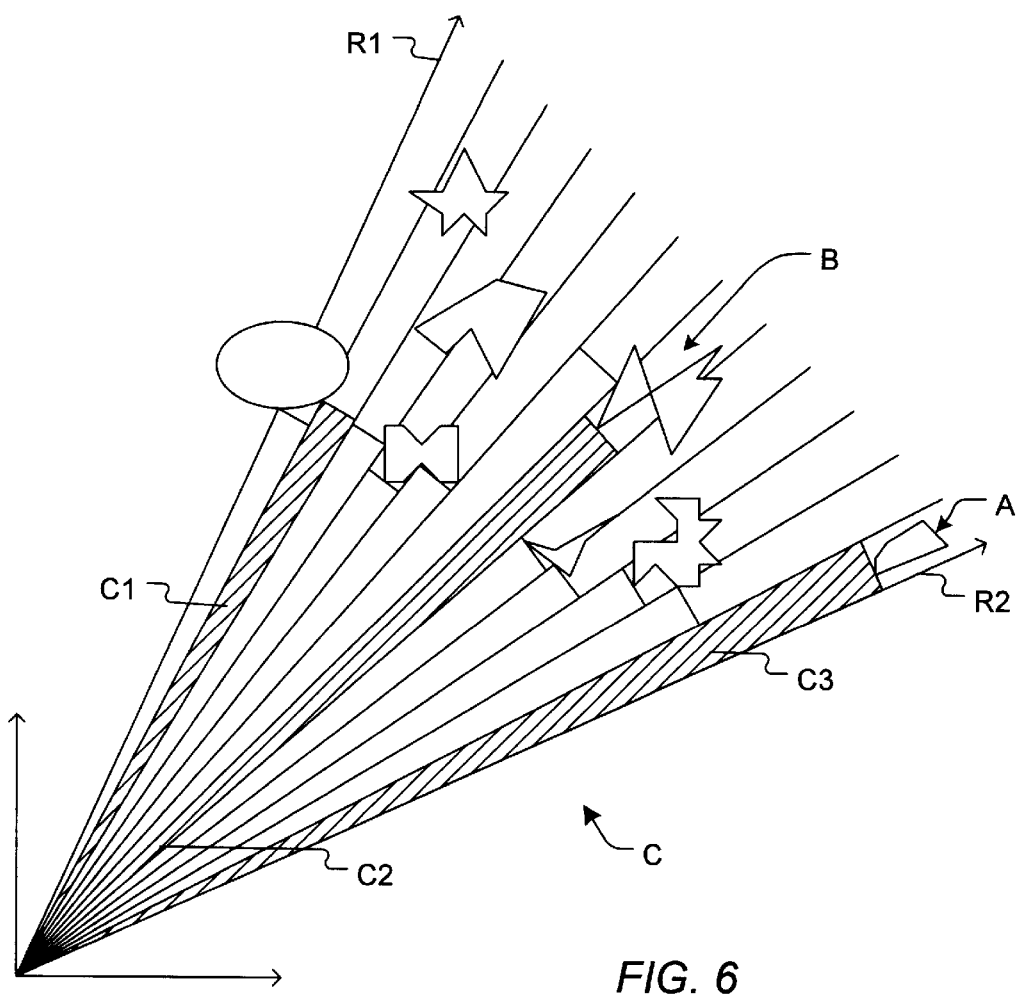
FIG. 6 illustrates a two-dimensional cone partitioned into a number of subcones which interact with a collection of objects by means of wavefronts propagating within each of the subcones.

FIG. 6 illustrates a two-dimensional cone C in a two-dimensional environment. Cone C is defined by the region interior to the rays R1 and R2 (and inclusive of those rays). The cone C is partitioned into a number of sub-cones. The ambient space is populated with a collection of two-dimensional objects. A wavefront propagates within each of the subcones. Each wavefront terminates upon its first interaction with an object. Three of the subcones are especially highlighted, i.e. subcones C1, C2 and C3. Subcone C1 interacts with two objects, i.e. an ellipse and a star shaped object. However, the wavefront propagating within subcone C1 terminates, by definition, upon its first interaction with an object. Since the wavefront interacts with the ellipse first, the wavefront terminates on the ellipse, and the star object is defined to be invisible with respect to this subcone. If higher resolution is desired, subcone C1 may be further partitioned into a set of smaller cones. Some of these smaller cones would then terminate on the ellipse, while others would terminate on the star-shaped object. Subcone C2 interacts with only one object, i.e. object B. The wavefront propagating with subcone C2 terminates at the point of first contact with object B.

It is noted that the cone-based object visibility query (modeled on the wavefront propagation concept) is an inherently spatial computation. Thus, the object visibility query for subcone C3 detects the small object A even though this object lies entirely in the interior of subcone C3. The visibility query computation will be explained in detail later.

Polyhedral Cones

Figure 7:
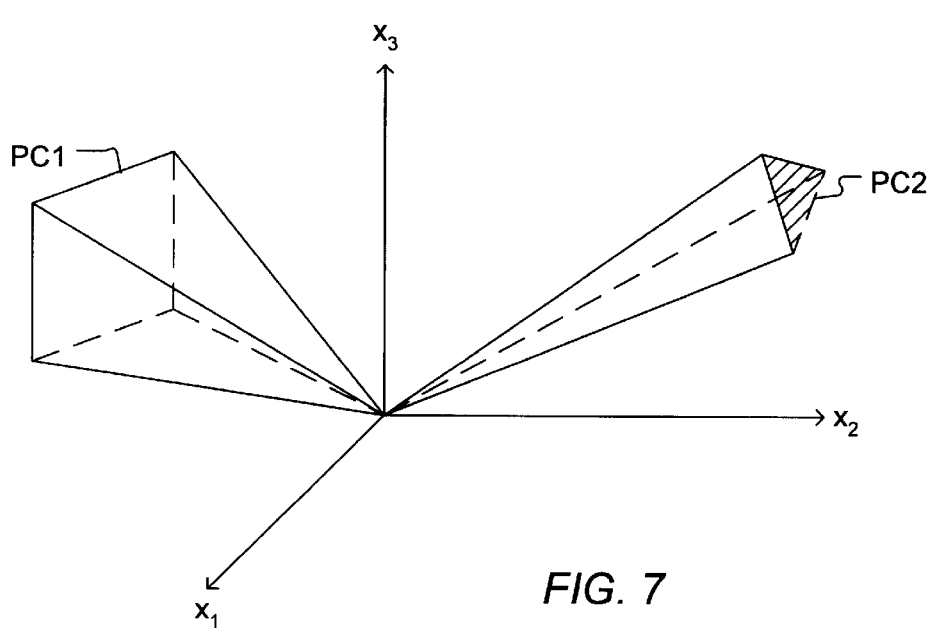
FIG. 7 illustrates polyhedral cones with rectangular and triangular cross-section emanating from the origin.
Figure 8A:
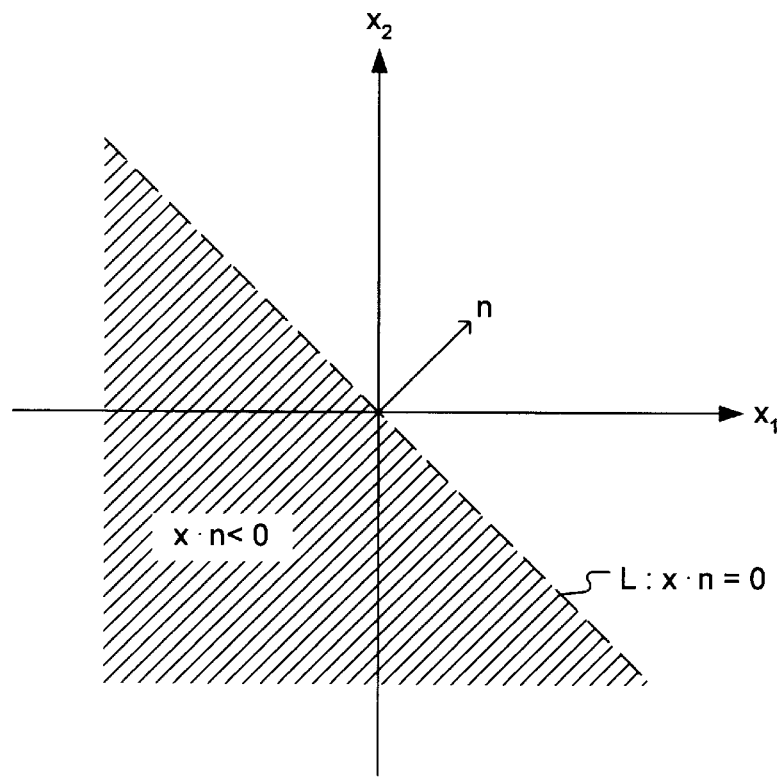
FIG. 8A illustrates the mathematical expressions which describe a line through the origin and a corresponding half-plane given a normal vector in two-dimensional space.

The spatial cones used in the preferred embodiment are polyhedral cones. The generic polyhedral cone has a polygonal cross-section. FIG. 7 give two examples of polyhedral cones. The first polyhedral cone PC1 has a rectangular cross-section, while the second polyhedral cone PC2 has a triangular cross-section. The view frustum is a cone with rectangular cross-section like cone PC1. Polyhedral cones are defined by homogeneous linear inequalities. Given a normal vector n, the equation n·x=0 involving vector argument x defines a plane passing through the origin and perpendicular to the normal vector n. This plane divides space into two half-spaces. The linear inequality n·x<0 defines the half-space from which the normal vector n points outward. FIG. 8A gives a two-dimensional example. As shown, the equation n·x=0 specifies the set of points (interpreted as vectors) which are perpendicular to normal n. This perpendicular line L divides the plane into two half-planes. The half-plane defined by the inequality n·x<0 is denoted by shading. Observe that the normal vector n points out of this half-plane.

Figure 8B:
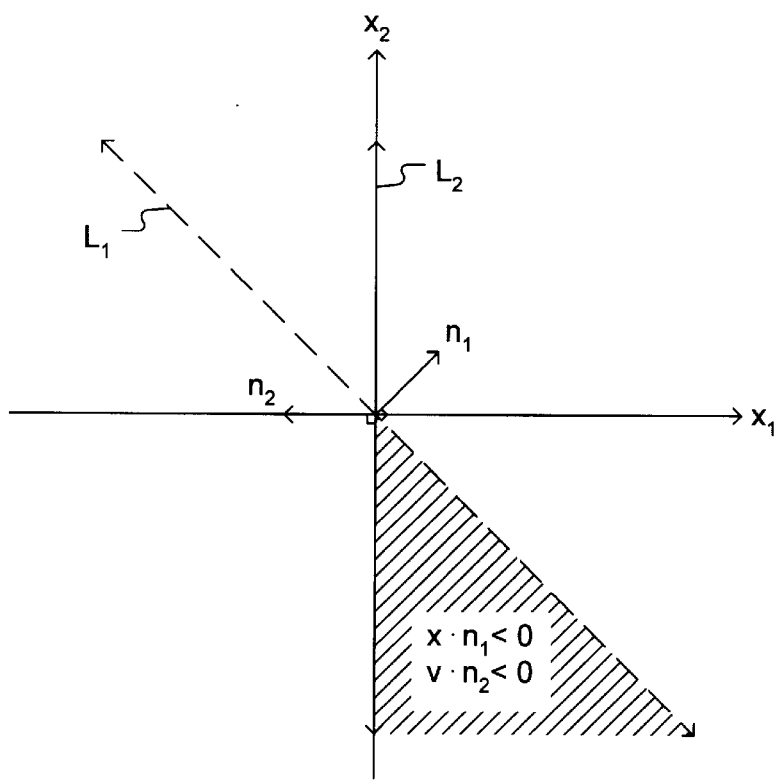
FIG. 8B illustrates the specification of a two-dimensional conic region as the intersection of two half-planes.

A polyhedral cone is constructed by intersection of multiple half-spaces. For example, solid cone PC2 of FIG. 7 is the intersection of three half-spaces. Similarly, solid cone PC1 is the intersection of four half-spaces. FIG. 8B provides a two-dimensional example of intersecting half-planes to generate a conic area. The two normal vectors $n_1$ and $n_2$ define perpendicular lines $L_1$ and $L_2$ respectively. The inequality $n_1 \cdot x < 0$ specifies the half-plane which is southwest (i.e. left and below) of the line $L_1$. The inequality $n_2 \cdot x < 0$ defines the half-plane which is to the right of line $L_2$. The solution to the simultaneous system of inequalities $n_1 \cdot x < 0$ and $n_2 \cdot x < 0$ is the intersection region denoted in shading. This system of inequalities may be summarized by the matrix equation $Sx \leq 0$, where the rows of matrix S are the normal vectors. From this discussion, it may be observed that solid cone PC1 of FIG. 7 is determined by four normal vectors. The normal matrix S would then have four rows (for the four normal vectors) and three columns corresponding to the dimension of the ambient space.

Thus, a polyhedral cone emanating from the origin is defined as the set of points satisfying a system of linear inequalities $Sx \leq 0$. [There is no loss of generality in assuming the origin to be the viewpoint.] According to this definition, half-spaces, planes, rays, and the origin itself may be considers as polyhedral cones. In addition, the entire space may be considered to be a polyhedral cone, i.e. that cone which is defined by an empty matrix S.

Distance Measurement

In view of the discussion concerning wave propagation, the distance of a object, hull, or bound from a particular viewpoint is defined to be the minimum distance to the object, hull, or bound from the viewpoint. So, assuming a viewpoint at the origin, the distance of the object, hull, or bound X from the viewpoint is defined as $$f(X) = \min_{x \in X} \|x\|,$$

where $\|x\|$ is the norm of vector x. When the object, hull, or bound X is empty, the distance is taken to be positive infinity.

Any vector norm may be chosen for the measurement of distance. In one embodiment, the Euclidean norm is chosen for distance measurements. The Euclidean norm results in a spherically shaped wavefront. Any wavefront shape may be used as long as it satisfies a mild "star-shape" criterion: the entire boundary of the wavefront must be unobstructed when viewed from the origin. All convex wavefronts satisfy this condition, and many non-convex ones do as well. In general, the level curves of a norm are recommended as the wavefront shapes. From a computational standpoint, the spherical wavefront shape given by the $L_2$ norm, and the piecewise-linear wavefront shapes given by the $L_1$, and $L_\infty$ norms provide good choices for visibility detection. Not surprisingly, piecewise-linear approximations of such norms, for example the approximation to the $L_2$ norm also works well: such an approximation is illustrated in FIG. 6.

Cones and Visibility

From a viewpoint located within a large set of objects, there exists at least one point (on some object) nearest to the viewpoint. Since that point (or set of points) is closest to the viewpoint, nothing can occlude the view of that point (or those points). This implies that the object (or objects) containing the nearest point (or points) is (are) at least partially visible.

Now, consider an arbitrary cone K emanating from the origin as a viewpoint. The unobstructed visibility argument holds even if all distance measurements are restricted to points that fall within the cone. Define the distance of an object, hull, or bound X relative to the cone K as $$f_K(X) = \min_{x \in X \cap K} \|x\|.$$

If the distance $f_K$ is computed for each object in a scene, the nearest object, i.e. the object which achieves a minimum distance value, is visible with respect to cone K. In fact, an object X is visible if and only if there exists a cone K such that (a) $f_K(X)$ is finite and (b) $f_K(X) \leq f_K(Y)$ holds for all objects Y in the set of objects.

It is noted that rays may be viewed as degenerate cones that emanate from the viewpoint and pass through the center of each pixel. The nearest object along each ray is visible and thus determines the value of the corresponding pixel. Similarly, it is possible to construct cones which emanate from the viewpoint and cover each pixel. For example, two or more cones with triangular cross-section may neatly cover the area of a pixel. The nearest object within each cone is visible and generates the value of the corresponding pixel.

As discussed above, the ray-based methods of the prior art are able to detect objects only up the resolution of the ray sample. Small visible objects or small portions of larger objects may be missed entirely due to insufficient ray density. In contrast, cones can completely fill space. Thus, the cone-based method of the present invention may advantageously detect small visible objects or portions of objects that would be missed by a ray-based method with equal angular resolution.

Generalized Separation Measurement

For the purposes of performing a visibility search procedure, it is necessary to have a method for measuring the extent of separation (or conversely proximity) of objects, bounds, or hulls with respect to cones. There exists a great variety of such methods in addition to those based on minimizing vector norms defined above. As alluded to above, a measurement value indicating the extent of separation between a set X and a cone K may be obtained by propagating a wavefront internal to the cone from the vertex of the cone and observing the radius of first interaction of the internal wavefront with the set X. As mentioned above, the wavefront must satisfy a mild "star shape" condition: the entire boundary of the wavefront must be visible from the vertex of the cone.

In one embodiment, the measurement value is obtained by computing a penalty of separation between the set X and the cone K. The penalty of separation is evaluated by minimizing an increasing function of separation distance between the vertex of the cone K and points in the intersection of the cone K and set X. For example, any positive power of a vector norm gives such an increasing function.

In another embodiment, the measurement value is obtained by computing a merit of proximity between the set X and the cone K. The merit of separation is evaluated by maximizing a decreasing function of separation distance between the vertex of the cone K and points in the intersection of the cone K and set X. For example, any negative power of a vector norm gives such a decreasing function.

A Cone Hierarchy

The visibility determination method of the present invention relies on the use of a hierarchy of cones in addition to the hierarchy of hulls described above. The class of polyhedral cones is especially well suited for generating a cone hierarchy: polyhedral cones naturally decompose into polyhedral subcones by the insertion of one or more separating planes. The ability to nest cones into a hierarchical structure allows a very rapid examination of object visibility. As an example, consider two neighboring cones that share a common face. By taking the union of these two cones, a new composite cone is generated. The composite cone neatly contains its children, and is thus capable of being used in querying exactly the same space as its two children. In other words, the children cones share no interior points with each other and they completely fill the parent without leaving any empty space.

A typical display and its associated view frustum has a rectangular cross-section. There are vast array of possibilities for tessellating this rectangular cross-section to generate a system of sub-cones. For example, the rectangle naturally decomposes into four rectangular cross-sections, or two triangular cross-sections. Although these examples illustrate decompositions using regular components, irregular components may be used as well.

Figure 9A:
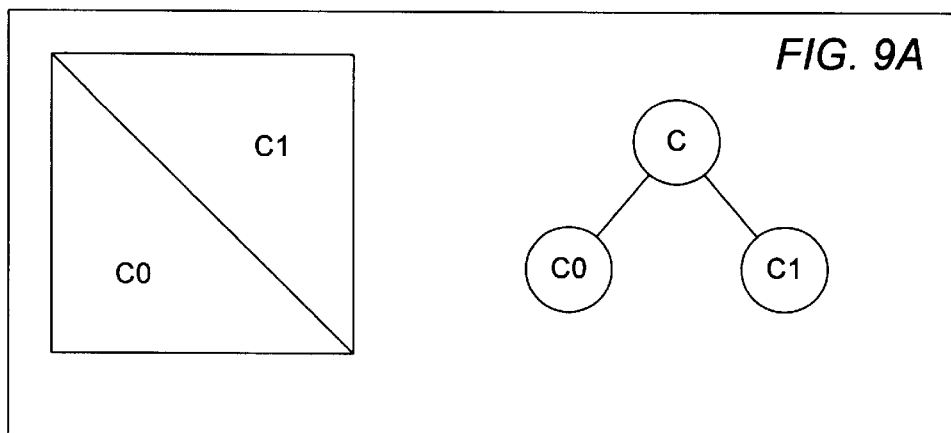
FIGS. 9A–9C illustrate the formation of a cone hierarchy based on repeated subdivision of an initial cone with rectangular cross-section.
Figure 9B:
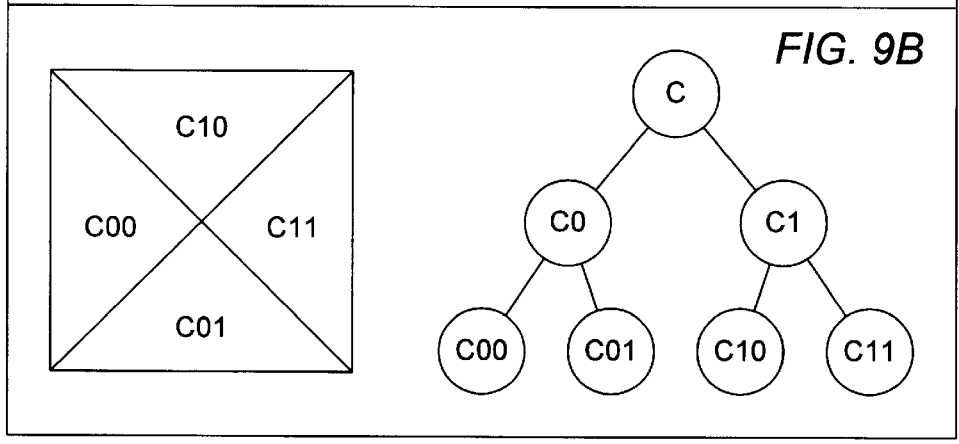
Figure 9C:
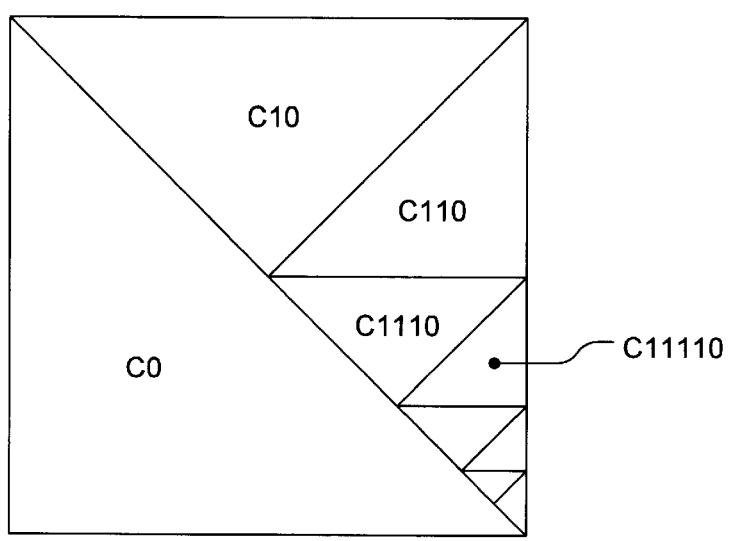

FIGS. 9A–9C illustrate a hierarchical decomposition of an initial view frustum C. FIG. 9A depicts the rectangular cross-section of the view frustum and its bisection into two cones with triangular cross-section, i.e. cones C0 and C1. The view frustum C corresponds to the root node of a cone tree. Cones and their corresponding nodes in the cone tree are identically labeled for simplicity. Each node of the cone tree stores the matrix S of normal vectors which generates the corresponding cone. The root node points to two children nodes corresponding to cones C0 and C1. FIG. 9B illustrates a second decomposition stage. Each of the cones C0 and C1 is bisected into two sub-cones (again with triangular cross-section). Cone C0 decomposes into the two sub-cones C00 and C01. Likewise, cone C1 is bisected into two sub-cones C10 and C11. Nodes are added to the cone tree to reflect the structure of this decomposition. The parent-child relation of nodes in the cone tree reflects the superset-subset relation of the respective cones in space. FIG. 9C illustrates the pattern of successive cone bisections according to one embodiment. Each cone in the hierarchy may be decomposed into two sub-cones by means a bisecting plane. FIG. 9C illustrate several successive descending bisections which generate cones C0, C10, C110, and C1110, and so on. The initial cone C (i.e. the view frustum) may be decomposed to any desired resolution. In one embodiment, the bisections terminate when the resultant cones intercept some fraction of a pixel such as, for example, ½ a pixel. The corresponding terminal nodes of the cone tree are called leaves. Alternate embodiments are contemplated where the bisections terminate when the resultant leaf-cones intercept areas which subtend (a) a portion of pixel such as 1/N where N is a positive integer, or (b) areas including one or more pixels.

The triangular hierarchical decomposition shown in FIGS. 9A–9C has a number of useful properties. By decomposing the original rectangular cone based on recursive bisection, a binary tree of cones of arbitrary depth is generated. Triangular cones have the fewest sides making them computational more attractive. Lastly, triangular cones can also tessellate the unit cube (or unit sphere). Thus, it is possible to create a hierarchical cone representation for the entire space surrounding the viewpoint.

It is noted that any cone decomposition strategy may be employed to generate a cone hierarchy. In a second embodiment, the view frustum is decomposed into four similar rectangular cones; each of these subcones is decomposed into four more rectangular subcones, and so on. This results in a cone tree with four-fold branches.

Discovering the Set of Visible Objects

Once the hull hierarchy and the cone hierarchy have been constructed, the set of visible objects is computed from the current viewpoint. In one embodiment, the visible object set is repeatedly recomputed for a succession of viewpoints and viewing directions. The successive viewpoints and viewing directions may be specified by a user through an input device such as a mouse, joystick, keyboard, trackball, or any combination thereof. The visible object determination method of the present invention is organized as a simultaneous search of the hull tree and the cone tree. The search process involves recursively performing cone-hull queries. Given a cone node K and a hull node H, a cone-hull query on cone K and hull H investigates the visibility of hull H and its descendent hulls with respect to cone K and its descendent cones. The search process has a computational complexity of order log M, where M equals the number of cone nodes times the number of hull nodes. In addition, many cone-hull queries can occur in parallel allowing aggressive use of multiple processors in constructing the visible-object-set.

Viewing the Scene

Independently, and also concurrently, the set of visible objects from the current viewpoint may be rendered on one or more displays. The rendering can occur concurrently because the visible-object-set remains fairly constant between frames in a walkthrough environment. Thus the previous set of visible objects provides an excellent approximation to the current set of visible objects.

Managing the Visible-Object-Set

The visualization software must manage the visible-object-set. Over time, as an end-user navigates through a model, just inserting objects into the visible-object-set would result in a visible-object-set that contains too many objects. To ensure good rendering performance, the visualization process must therefore remove objects from the visible-object-set when those objects no longer belong to the set—or soon thereafter. A variety of solutions to object removal are possible. One solution is based on object aging. The system removes any object from the visible-object-set that has not been rediscovered by the cone query within a specified number of redraw cycles.

Computing Visibility Using Cones

Substantial computation leverage is provided by recursively searching the hierarchical tree of cones in conjunction with the hierarchical tree of hulls. Whole groups of cones may be tested against whole groups of hulls in a single query. For example, if a parent cone does not intersect a parent hull, it is obvious that no child of the parent cone can intersect any child of the parent hull. In such a situation, the parent hull and all of its descendants may be removed from further visibility considerations with respect to the parent cone.

Visibility Search Algorithm

In the preferred embodiment, the visibility search algorithm of the present invention is realized in a visibility search program stored in memory 106. Thus, hereinafter the terms visibility search program and visibility search algorithm will be used interchangeably. The visibility search program performs a recursive search of the two trees (the object tree and the cone tree) to assign visible objects to each of the leaf cones of the cone tree. The host processor 102 executes the visibility search program. In an alternate embodiment, the visibility search program executes on a processor comprised within the graphics accelerator 112.

The recursive search of the two trees provides a number of opportunities for aggressive pruning of the search space. Central to the search is the object-cone distance measure defined above, i.e. given a cone K and an object (or hull) X, the object-cone distance is defined as $$f_K(X) = \min_{x \in X \cap K} \|x\|.$$

It is noted that this minimization is in general a nonlinear programming problem since the cones and object hulls are defined by constraint equations, i.e. planes in three-space. If the vector norm $\|x\|$ is the $L^1$ norm (i.e. the norm defined as the sum of absolute values of the components of vector x), the nonlinear programming problem reduce to a linear programming problem. If the vector norm $\|x\|$ is the Euclidean norm, the nonlinear programming problem reduce to a quadratic programming problem. Given a collection of objects, the object X which achieves the smallest distance $f_K(X)$ is closest to the cone's viewpoint, and therefore must be at least partially visible.

The recursive search starts with the root H of the hull tree and the root C of the cone tree (see FIGS. 4 and 9). Remember that each node of the hull tree specifies a bounding hull which contains the hulls of all its descendant nodes. Initially the distance between the root cone and the root hull is computed. If that distance is infinite, then no cone in the cone hierarchy intersects any hull in the hull hierarchy and there are no visible objects. If the distance is finite, then further searching is required. Either tree may be refined at this point. In the preferred embodiment, both trees are refined in a predefined order.

The pruning mechanism is built upon several basic elements. A distance measurement function computes the distance $f_K(X)$ of a hull X from the viewpoint of a cone K. In other words, the function determines the cone-restricted distance to the hull X. In the preferred embodiment, the minimization associated with evaluating the distance measurement function is implemented solving an associated linear programming problem.

To facilitate the search process, each leaf-cone, i.e. each terminal node of the cone tree, is assigned an extent value which represents its distance to the closest known object-hull. Thus, this extent value may be referred to as the visibility distance. The visibility distance of a leaf-cone is non-increasing, i.e. it decreases as closer objects (i.e. object hulls) are discovered in the search process. Visibility distances for all leaf-cones are initialized to positive infinity. [An object-hull is a hull that directly bounds an object. Thus, object-hulls are terminal nodes of the hull tree.] In addition to a visibility distance value, each leaf-cone node is assigned storage for an currently visible object. This object attribute is initialized to NO_OBJECT or BACKGROUND depending upon the scene context.

In addition, each non-leaf cone, i.e. each cone at a non-final refinement level, is assigned an extent value which equals the maximum of its sub-cones. Or equivalently, the extent value for a non-leaf cone equals the maximum of its leaf-cone descendents. These extent values are also referred to as visibility distance values. The visibility distance values for all non-leaf cones are initialized to positive infinity also (consistent with initialization of the leaf-cones). Suppose a given non-leaf cone K and a hull H achieve a cone-object distance $f_K(X)$. If this distance $f_K(X)$ is greater than the visibility distance value of the cone K, then all of the leaf-cone descendents of cone K already have known objects closer than the hull H. Therefore, no benefit can be gained by searching hull H against cone K and its descendents. In contrast, if a hull H achieves a distance $f_K(X)$ from cone K which is less than the visibility distance value of cone K, it is possible that hull H contains objects which will strictly decrease the visibility distance of some leaf-cone descendent of cone K. Thus, the hull H and its descendents should be searched against cone K and its descendents.

The following code fragment illustrates the beginning of the search process. The variables hullTree and coneTree point to the root nodes of the hull tree and cone tree respectively.

```
main(hullTree, coneTree) {
    cone.extent=infinity;
    distance=DIST(hullTree, coneTree);
    if(distance<infinity)
        findVisible(hullTree, coneTree, distance);
}
```

The DIST function evaluates the distance between the root hull and the root cone. If this distance is less than positive infinity, the function findvisible is called with the root hull, root cone, and their hull-cone distance as arguments. The function findVisible performs the recursive search of the two trees.

Figure 10A:
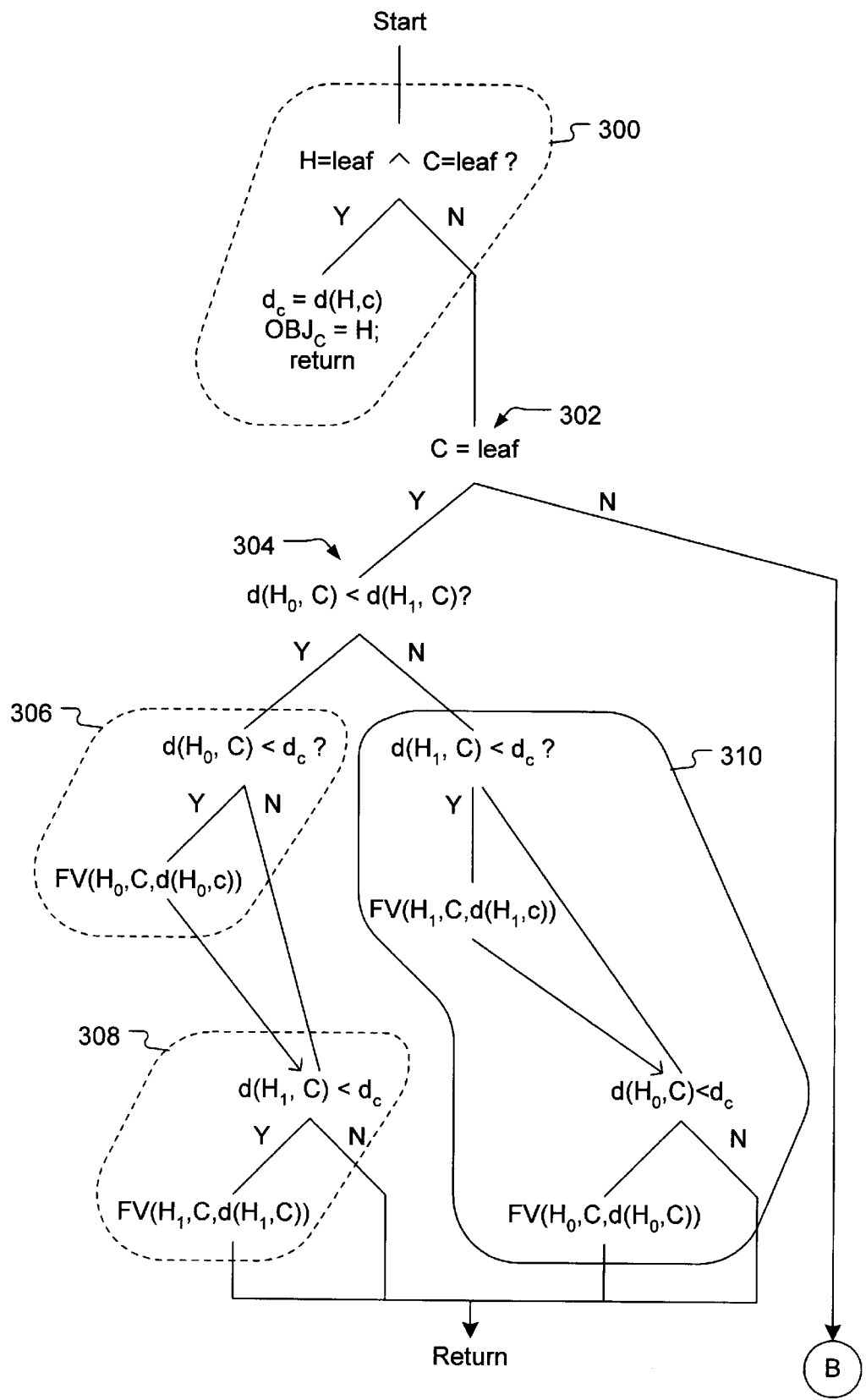
FIG. 10 illustrates a visibility search algorithm according to the present invention.
Figure 10B:
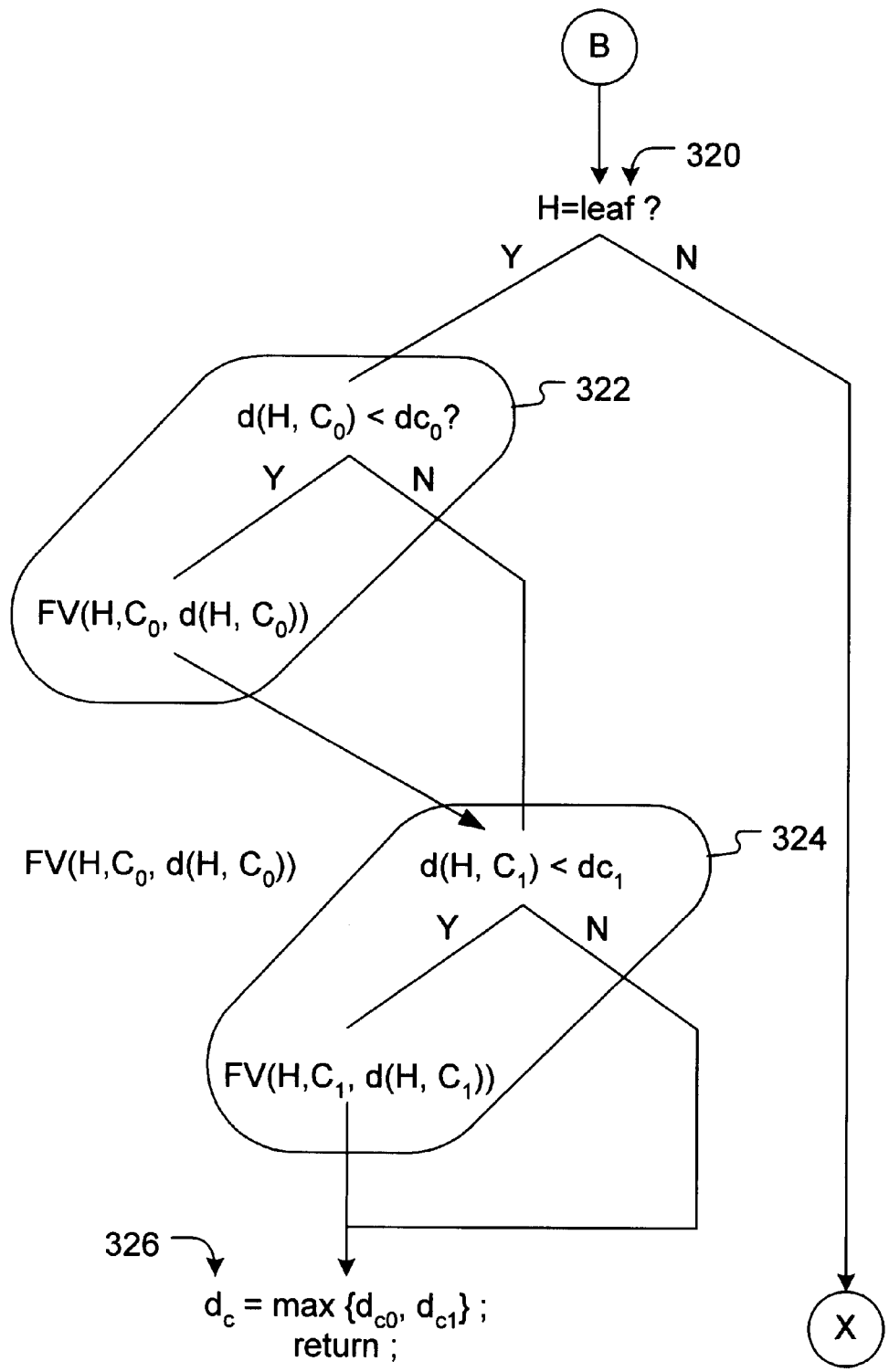
Figure 10C:
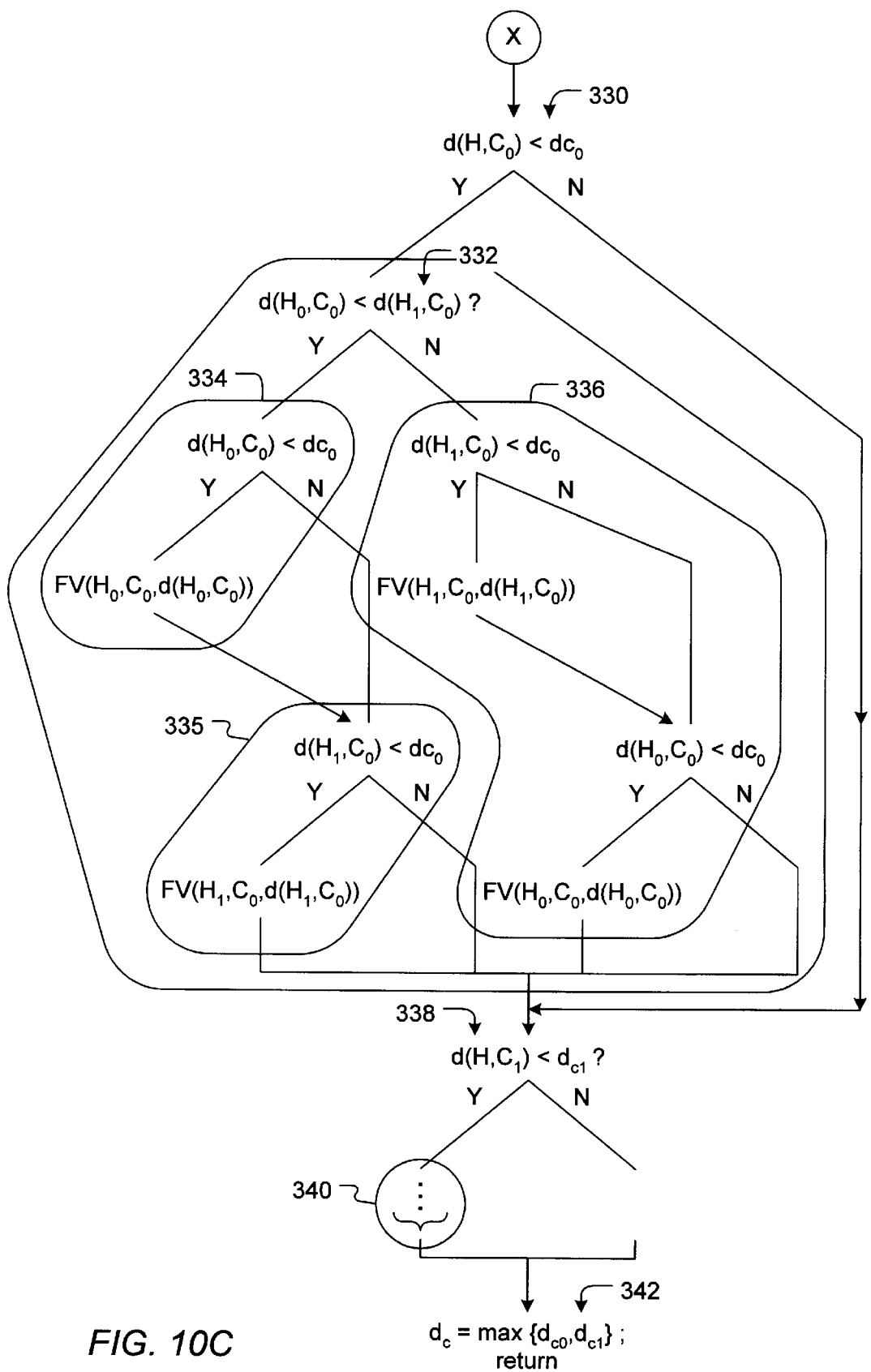

FIGS. 10A–10C illustrate one embodiment of the findVisible function (also referred to by the contraction FV). Refer to the Appendix for a source code embodiment of the findVisible function. The findVisible function receives several input variable from a calling routine as illustrated by the following function prototype:

findVisible(H, C, d)

where H is a hull node to be explored against the cone node C. The value d represents the cone-hull distance between cone C and hull H. In step 300, the findVisible function determines whether the cone C and hull H are both leaf nodes, i.e. terminal nodes of their respective trees. If so, the visibility distance value $d_c$ for the leaf-cone C is set equal to the current distance to object hull H. In addition, the object attribute of leaf-cone C is assigned the value of hull H. Then control is returned to the calling routine.

If the hull H and cone C are not both leaves, step 302 is performed. In step 302, the findVisible function determines if the cone C is itself a leaf node of the cone tree. If so, steps 304 through 310 are performed. In step 304, the children of hull H are investigated, i.e. the distances of cone C to the subhulls H0 and H1 are compared. [The children of hull H will be generically referred to as H0 and H1.] If the distance to subhull H0 is smaller than the distance to subhull H1, steps 306 and 308 are performed. Otherwise, step 310 is performed. Step 304 is performed in order to determine which subhull will be allowed the opportunity of first interaction with cone C. In the preferred embodiment of the invention, the closer subhull is searched first.

In step 306, the findVisible function determines the cone-hull distance of subhull H0 from cone C is less than the visibility distance value $d_C$ of cone C. If so, the findVisibility function is called again in order to search subhull H0 against cone C. The cone-hull distance between cone C and subhull H0 is provided as the distance argument for the function call. If the distance to subhull H0 is not less than the current visibility distance, step 308 is performed.

In step 308, the findVisible function determines if the cone-hull distance of subhull H1 from cone C is smaller than the visibility distance value of cone C. If it is smaller, the findVisibility function is called again in order to search subhull H1 against cone C. The cone-hull distance between cone C and subhull H1 is provided as the distance argument for the function call. If the distance to subhull H1 is not less than the current visibility distance, program control returns to the calling program.

It is noted that the call to the function findVisible in step 306 may cause the visibility distance value for cone C to decrease. Thus, the visibility distance value for cone C may actually have a smaller value when tested in step 308 than when tested in step 306. This underscores the importance of the test performed in step 304 to determine the subhull which is closer to cone C. The closer hull is searched first and allowed to preempt the more distant subhull. In other words, after searching the closer subhull, the more distant subhull may not need to be searched. Thus, the distance conditioned search order for subhulls advantageously improves the efficiency of the visibility search algorithm.

In step 310, the subhulls are searched in the opposite order in response to the determination of step 304 that subhull H0 achieves a cone-hull distance from cone C which is not less than the corresponding distance for subhull H1. Again, the closer subhull H1 is searched first and allowed to preempt the search of the farther subhull H0.

If, in step 302, it is determined that cone C is not a leaf, step 320 is performed (see FIG. 10B). In step 320, the findVisibility function determines if the hull node H is a leaf node, i.e. an object hull, of the hull hierarchy. If so, the children of cone C are explored with respect to object hull H in steps 322 through 326. In step 322, the findVisibility function determines if the cone-hull distance between hull H and child subcone C0 is less than the visibility distance value of child subcone C0. If so, the findVisibility function is called again in order to explore hull H with respect to subcone C0. Thus, hull H, subcone C0 and the cone-hull distance between these two are supplied to the findVisibility function as arguments. When the findVisibility function returns, control passes to step 324. Also, if the inequality test of step 322 fails, control passes to step 324.

In step 324, the find Visibility function determines if the cone-hull distance of hull H from subcone C1 is less than the visibility distance value for subcone C1. If so, the findVisibility function is called again in order to explore hull H with respect to subcone C1. Thus, hull H, subcone C1 and the cone-hull distance between these two are supplied to the findVisibility function as arguments. When the findVisibility function returns, control passes to step 326. Also, if the inequality test of step 324 fails, control passes to step 326.

Since the visibility distance values for subcones C0 and C1 may have decreased by the interactions with hull H in steps 322 and 324 respectively, the visibility distance value for cone C must be updated. Thus, in step 326, the visibility distance value for cone C is set equal to the maximum of the visibility distance values of subcones C0 and C1. After step 326, program control returns to the calling routine.

If, in step 320, the hull node H is determined not to be a leaf node, then step 330 is performed (see FIG. 10C). Thus, step 330 and succeeding steps may assume that neither hull H nor cone C are leaf nodes in their respective hierarchies. Steps 332, 334, 335 and 336 explore the children of hull H with respect to cone C0 conditioned upon the result of testing step 330. Similarly, step 340 explores the children of hull H with respect to subcone C1 conditioned upon the result of testing step 338.

In step 330, the findVisibility function determines if the cone-hull distance between hull H and subcone C0 is less than the current visibility distance value of subcone C0. If so, step 332 is performed. In step 332, the cone-hull distances of subhulls H0 and H1 from subcone C0 are compared. The closer subhull is given the opportunity of first interaction with subcone C0. Thus, if the cone-hull distance of subhull H0 from subcone C0 is smaller than the cone-hull distance of subhull H1 from subcone C0, step 334 is performed. Otherwise step 336 is performed.

In step 334, the findVisibility function determines if the cone-hull distance of subhull H0 from subcone C0 is less than the current visibility distance value of subcone C0. If so, the findVisibility function is called again in order to explore subhull H0 against subcone C0. Thus, subhull H0, subcone C0, and the cone-hull distance between these two are provided as arguments to the findVisibility function. When this call to the findVisibility function returns, step 335 is performed.

If, in step 334, it is determined that the cone-hull distance of subhull H0 from subcone C0 is not smaller than the visibility distance value of subcone C0, step 335 is performed. In step 335, the findVisibility function determines if the cone-hull distance of subhull H1 from subcone C0 is smaller the visibility distance value of subcone C0. If so, the findVisibility function is called again in order to explore subhull H1 with respect to subcone C0. Thus, subhull H1, subcone C0, and the cone-hull distance between them are provided as arguments to the findVisibility function. When this call to the findVisibility function returns, program control passes to step 338. Additionally, if the inequality test of step 335 fails, step 338 is performed.

Since the closer subhull H0 is allowed the first interaction with cone C0, it may alter (i.e. decrease) the visibility distance value of subcone C0. Thus, the farther subhull H1 may have more difficulty in passing the inequality test of step 335 due to the prior interaction of subhull H0. In other words, the exploration of subhull H1 with respect to subcone C0 may not need to be performed, and advantageously skipped, in view of the prior interaction with the closer subhull H0. Thus, the search efficiency of the visibility determination method is improved by avoiding unnecessary subhull explorations.

Step 336 is performed in response to a determination in step 332 that the cone-hull distance of subhull H0 from subcone C0 is not less than the cone-hull distance of subhull H1 from subcone C0. In other words, step 336 is performed when subhull H1 is closer to subcone C0 than subhull H0. Step 336 involves operations similar to those performed in steps 334 and 335. However, the conditional search of subhull H1 to performed before the conditional search of subhull H0, i.e. the closer subhull is searched first. After step 336 control passes to step 338.

If, in step 330, it is determined that the cone-hull distance of hull H from cone C0 is not less than the visibility distance of subcone C0, control passes to step 338. In step 338, the findVisibility function determines if the cone-hull distance of hull H from subcone C1 is less than the visibility distance value of subcone C1. If so, step 340 is performed. Step 340 performs conditional exploration of subhulls H0 and H1 with respect to subcone C1. Thus, step 340 involves operations similar to those described in steps 332, 334, 335 and 336 with the roles of subcone C0 and subcone C1 are interchanged. After step 340, step 342 is performed. In addition, if the inequality test of step 338 fails, step 342 is performed.

In step 342, the visibility distance value of cone C is set equal to the maximum of the visibility distance values of subcones C0 and C1. After step 342, program control returns to the calling routine.

As explained above, the visibility distance value assigned to each cone in the cone tree equals the maximum of the visibility distance values assigned to its subcone children. Thus, if a given hull node achieves a distance to a cone which is larger than the cone's current visibility distance value, it is immediately apparent that none of the hulls descendents will be of interest to any of the cone's descendents. The given hull node may be skipped so far this cone is concerned.

A cone's visibility distance value decreases as the recursion tests more and more object-cone leaf pairs. As nearby objects are discovered, a cone's visibility distance value decreases and the probability of skipping unpromising hull nodes increases. A leaf in the hull tree bounds the volume of the associated object and also approximates that object's contents. Thus, cone visibility distance values, set during recursion, are usually not the real distances to objects but a conservative approximation of those distances. If the conservative approximation is inadequate for use in an application, then that application can invoke an exact-computation for the visibility distance values.

Throughout the above discussion of the visibility search algorithm it has been assumed that the DIST function used to compute cone-hull separation distance is based on minimizing an increasing function of separation distance between the vertex of the given cone and points in the intersection of the given cone and the given bound/hull. However, it is noted that the DIST function may be programmed to compute a merit of proximity between a given cone and given bound/hull. The resulting merit value increases with increasing proximity and decreases with increasing separation, converse to the typical behavior of a distance function. In this case, the visibility search algorithm performs a search of bound/hull H against cone K only if the merit value of separation between cone K and bound/hull H is greater than the current merit value associated with cone K. Furthermore, after a search of subcones of cone K is completed, the merit value associated with the cone K is updated to equal the minimum of the merit values of its subcone children.

In general, the DIST function determines a cone-hull measurement value of separation by computing the extremum (i.e. minimum or maximum) of some monotonic (increasing or decreasing) function of separation between the vertex of the cone K and points in the intersection of cone K and bound/hull H. The search of cone K against a bound/hull H is conditioned on the bound/hull H achieving a cone-hull measurement value with respect to cone K which satisfies an inequality condition with respect to measurement value assigned to cone K. The sense of the inequality, i.e. less than or greater than, depends on the whether the DIST function uses an increasing or decreasing function of separation.

While the search of the hull and cone hierarchies described above assumes a recursive form, it is noted that any search strategy may be employed. In one alternate embodiment, the hull and/or cone hierarchies are searched iteratively. Such a brute force solution may be advantageous when a large array of processor is available to implement the iterative search. In another embodiment, a level-order search is performed on the hull and/or cone hierarchies.

Method for Displaying Visible Objects

Figure 11:
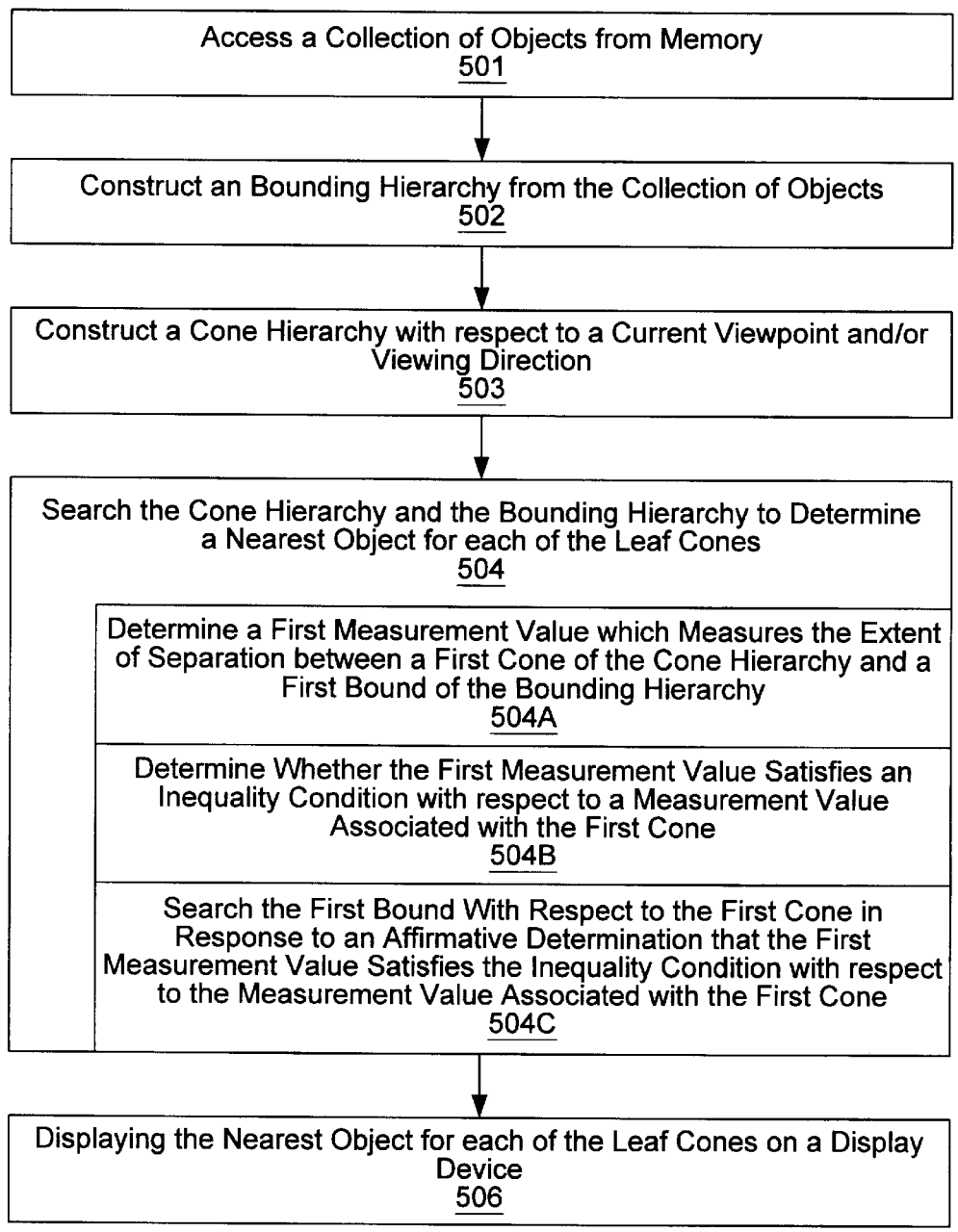
FIG. 11 illustrates a method for displaying visible objects in a graphics environment.

A method for displaying visible objects in a graphics environment is described in the flowchart of FIG. 11. A visibility search algorithm executing on CPU 102 or optionally graphics accelerator 112 controls the determination of a set of visible objects for display on display screen 84. In step 501, a collection of objects is accessed from memory 106. In step 502, a bounding hierarchy is constructed from the collection of objects. The construction of the bounding hierarchy will be described in detail below in conjunction with FIG. 12. In step 503 a cone hierarchy is constructed by refining an initial cone. Refer to the discussion above in connection with FIGS. 6–9 for more information on construction of the cone hierarchy. In one embodiment, the initial cone is the entire space. In a second embodiment, the initial cone corresponds to a neighborhood which contains the view frustum and a neighborhood around the view frustum. Thus, if the viewing orientation (i.e. direction) changes so that the new view frustum remains within the neighborhood of the initial cone, the cone hierarchy may not need to be reconstructed, thereby saving computational bandwidth. Each cone in the cone hierarchy is allocated a measurement value which corresponds to totally un-occluded visibility.

In step 504, a search of the cone hierarchy and the bounding hierarchy is performed. The search procedure determines a nearest object for each of the leaf cones of the cone hierarchy. It is noted that some leaf cones may not interact with any object in the given collection. In this case, the nearest object may be interpreted to be the background.

The search procedure performs conditional explorations of cone-bound pairs starting with the root cone of the cone hierarchy and the root bound of the bounding hierarchy. Given a first cone in the cone hierarchy and a first bound in the bounding hierarchy, the search algorithm determines a first measurement value which indicates an extent of separation between the first cone and the first bound as shown in step 504A.

In step 504B, the first measurement value is compared to a measurement value associated with the first cone. If the first measurement value satisfies an inequality condition with respect to the measurement value associated with the first cone, the first bound is searched with respect to the first cone as shown in step 504C. In general, the measurement value associated with a non-leaf cone reflects the maximum of the measurement values of its leaf-cone descendents, and the measurement value associated with a leaf-cone indicates the extent of separation between the leaf-cone and its nearest known object. Therefore, no benefit can be gained by searching the first bound with respect to the first cone if the comparison of step 504B indicates that the first bound is farther than the nearest known object for each of the leaf-cone descendents of the first cone. Steps 504B and 504C are together referred to as a conditioned search. Thus, the first bound and first cone are explored only if there is evidence that the first bound is closer than the nearest known object for at least one leaf descendent of the first cone.

In step 506, the nearest objects for a subset of cones of the cone hierarchy are displayed on display device 84. In the preferred embodiment, the subset of cones comprises the leaf-cones of the cone hierarchy, i.e. the nearest object for each leaf-cone in the cone hierarchy is displayed on display device 84. Tremendous processing bandwidth is saved by requesting rendering computations only for the objects which are visible. The nearest object to a leaf cone is the visible object for that cone. It is noted that the visibility search performed in step 504 may be performed repeatedly for different viewpoints and/or viewing directions. Thus, the display step 506 may advantageously be performed in parallel with step 504. While, the visibility search 504 is being preformed for a current viewpoint/view-direction, the results from a previous visibility search may be concurrently displayed in step 506.

In one embodiment, the first measurement value comprises a penalty of separation between the first cone and the first bound which is determined by minimizing an increasing function of separation distance between the vertex of the first cone and points in the intersection of the first cone and the first bound. In this case, step 504B determines whether the first measurement value is smaller than the measurement value associated with the first cone since smaller measurement values indicate closer proximity. In other words, the inequality condition of step 504B is satisfied when the first measurement value is less than the measurement value associated with the first cone. The increasing function of separation distance may be specified by a vector norm. For example, the expression $\|s\|$ defines an increasing function of separation distance, where s is a displacement vector representing the vector difference between the vertex of the first cone and an arbitrary point in the intersection of the first cone and the first bound, and $\|.\|$ denotes a vector norm. Examples, of vector norms include the $L^1$ norm, the $L^2$ norm, the $L^\infty$ norm, and in general, any of the $L^P$ norms where p is any real number in the range from one to infinity inclusive. The $L^1$ norm of a vector is defined as the sum of the absolute values of its components. The $L^2$ norm of a vector is defined as the square root of the sum of the squares of the vector components. The $L^{28}$ norm of a vector is defined as the maximum of the absolute values of the vector components.

In the preferred embodiment, the first measurement value of separation between the first bound and the first cone is computed by solving a linear programming problem using the linear constraints given by normal matrix S for the first cone, and the linear constraints given by the normal matrix N and the extent vector c for the first bound. Recall the discussion in connection with FIGS. 9A–9C.

In an alternate embodiment, the first measurement value comprises a merit of proximity (i.e. closeness) between the first cone and the first bound which is determined by maximizing a decreasing function of separation distance between the vertex of the first cone and points in the intersection of the first cone and the first bound. In this case, step 504B determines whether the first measurement value is larger than the measurement value of associated with the first cone since larger measurement values indicate closer proximity. In other words, the inequality condition of step 504B is satisfied when the first measurement value is greater than the measurement value associated with the first cone.

Figure 12:
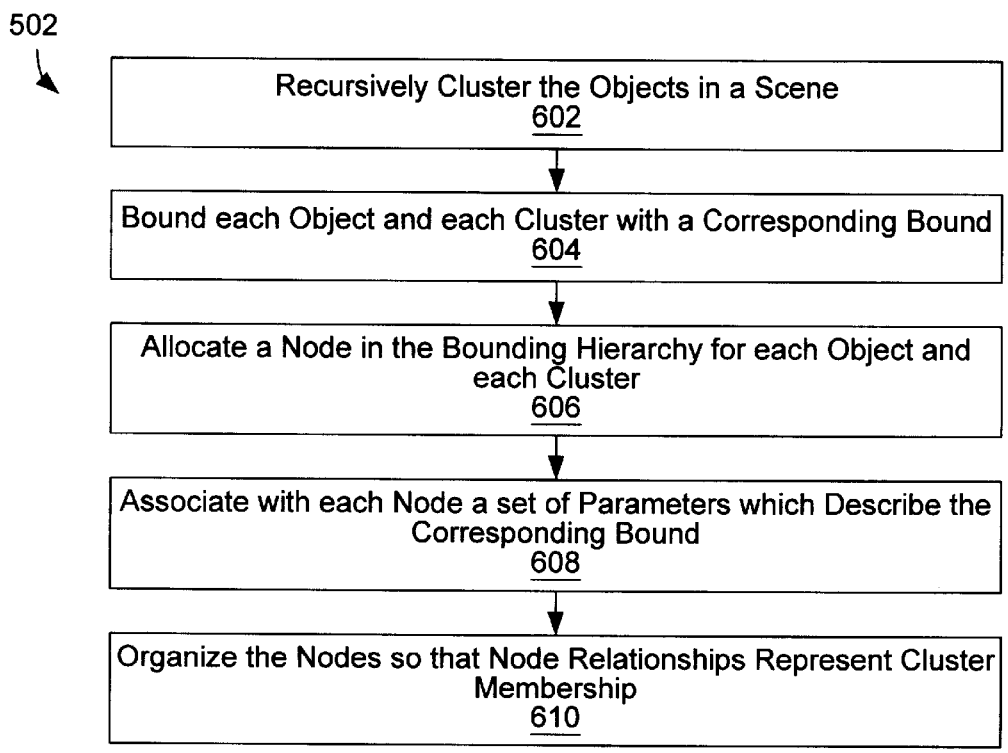
FIG. 12 illustrates the process of recursively clustering a collection of objects to form a bounding hierarchy.

FIG. 12 illustrates step 502, i.e. the construction of the bounding hierarchy from the collection of objects. In step 602, the objects in the graphics scene are recursively clustered. Objects are assembled into clusters preferably based on proximity. These first order clusters are themselves assembled into second order clusters. Clusters of successively higher order are formed until all the objects are contained in one universal cluster. Objects may be considered as order zero clusters. In step 604, each cluster of all orders is bounded with a corresponding bound. The bounds are preferably polytope hulls as described above in connection with FIGS. 4 and 5. However, other types of bounds are contemplated such as, e.g., quadratic surfaces, generalized polynomial bounds, etc.

In step 606, a hierarchical tree of bounds is generated by allocating a node for each of the objects and clusters. In step 608, each node is assigned parameters which describe (characterize) the corresponding bound. In one embodiment this parameter assignment comprises storing the extent vector c which locates the polytope hull faces as described in connection with FIGS. 5A and 5B. In step 610, the nodes are organized so that node relationships correspond to cluster membership. For example, if node A is the parent of node B in the bounding hierarchy, then the cluster corresponding to node A contains a subcluster corresponding to node B, and the bound for node A contains the bound for node B.

Although the construction of the cone hierarchy above has been described in terms of recursive clustering, it is noted alternative embodiments are contemplated which use other forms of clustering such as iterative clustering.

A Terminal Cone-Bound Pair

Figure 13:
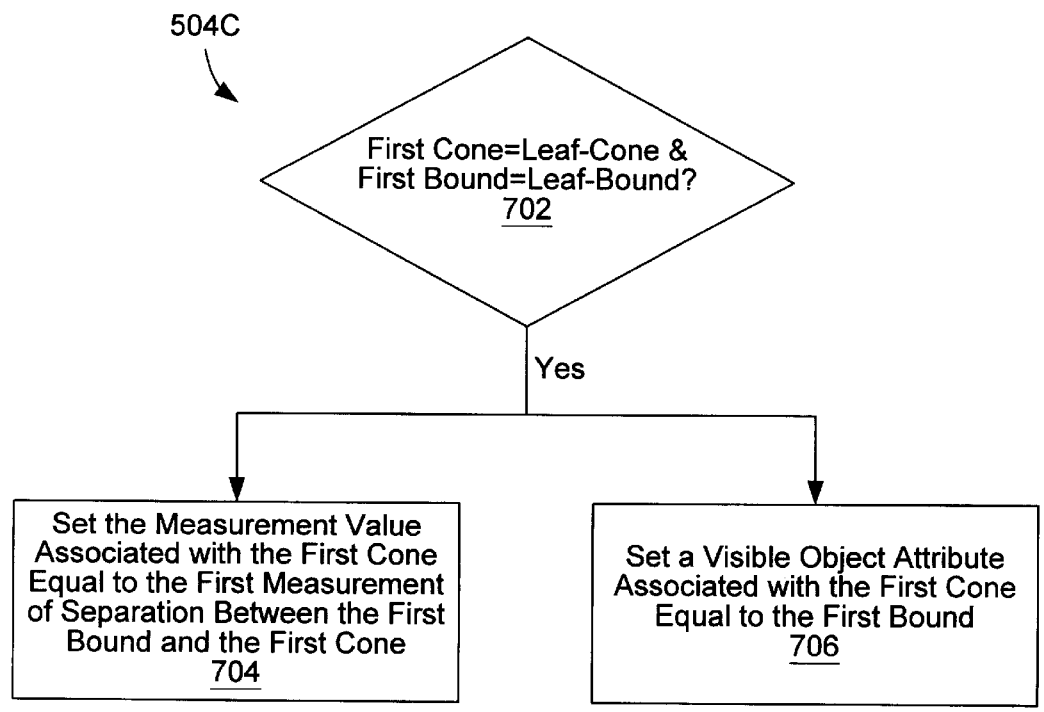
FIG. 13 illustrates the processing steps to be performed when the visibility search arrives at a terminal cone and a terminal bound.

FIG. 13 illustrates a first portion of step 504C, i.e. the step of searching the first bound with respect to the first cone, when both the first bound and the first cone are leaves of their respective hierarchies. In step 702, the visibility search algorithm determines whether the first cone and the first bound are leaves of their respective hierarchies. If they are both leaves, the visibility search algorithm (a) sets the measurement value associated with the first cone equal to the first measurement value of separation between the first bound and the first cone as shown in step 704, and (b) sets a visible object attribute associated with the first cone equal to the first bound as shown in step 706. It is noted that steps 704 and 706 may be performed in any order or in parallel.

A Terminal Cone with a Non-Terminal Bound

Figure 14:
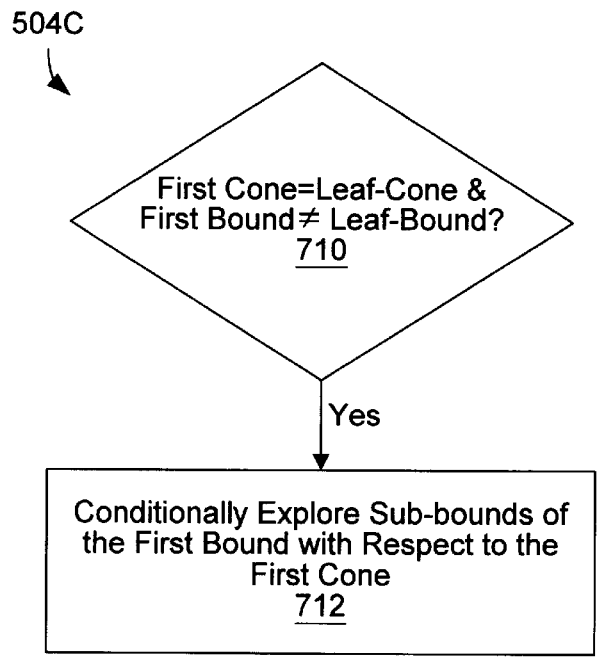
FIG. 14 illustrates the processing steps to be performed when the visibility search arrives at a terminal cone and a non-terminal bound.

FIG. 14 illustrates a second portion of step 504C, i.e. the step of searching the first bound with respect to the first cone, when the first cone is a leaf of the cone hierarchy, and the first bound is not a leaf of the bounding hierarchy. In step 710, the visibility search algorithm determines whether the first cone is leaf-cone of the cone hierarchy, and the first bound is a non-leaf bound of the bounding hierarchy, i.e. a non-terminal bound. In response to an affirmative determination that the first cone is a leaf cone and the first bound is not a leaf bound, the sub-bounds of the first bound are conditionally explored with respect to the first cone.

Figure 15:
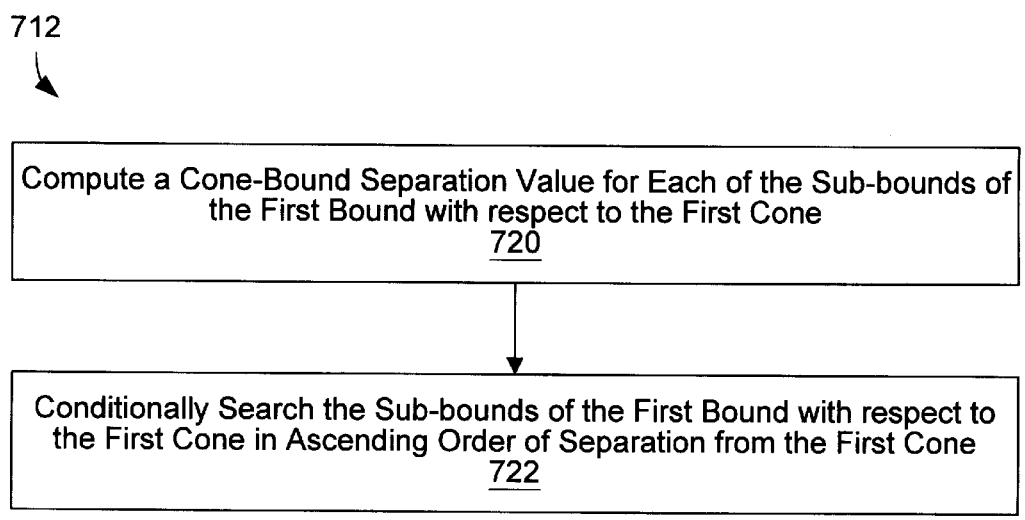
FIG. 15 further elaborates step 712 of FIG. 14, i.e. the step of conditionally exploring subbounds of the first bound with respect to the first cone.

FIG. 15 illustrates step 712, i.e. the step of conditionally exploring the sub-bounds of the first bound with respect to the first cone. In step 720, the visibility search algorithm computes a cone-bound separation value for each of the sub-bounds of the first bound with respect to the first cone.

In one embodiment, the cone-bound separation values are computed in the same way as the first measurement value. In step 722, the visibility search algorithm conditionally searches sub-bounds of the first bound with respect to the first cone in ascending order of their separation from the first cone. The cone-bound separation values are used to determine the ascending order. In other words, if sub-bound A is closer to the first cone than sub-bound B, sub-bound A is conditionally searched before sub-bound B.

FIG. 16 illustrates step 722, i.e. the conditional search of the sub-bounds of the first bound with respect to the first cone by means of a generic first subbound of the first bound. In step 730, the visibility search algorithm determines whether the cone-bound separation value of the first subbound satisfies an inequality condition with respect to the measurement value associated with the first cone. The sense of the inequality tested in step 730 may be the same as the sense of the inequality tested in step 504B.

In step 732, the visibility search algorithm searches the first subbound with respect to the first cone in response to an affirmative determination that the cone-bound separation value of the first subbound satisfies the inequality condition with respect to the first cone's measurement value.

A Terminal Hull with a Non-Terminal Cone

FIG. 17 illustrates a third portion of step 504C, i.e. the step of searching the first bound with respect to the first cone when the first bound is a leaf-bound of the bounding hierarchy, and the first cone is a non-leaf cone of the cone hierarchy. In step 740, the visibility search algorithm determines if the first bound is a leaf of the bounding hierarchy and the first cone is a non-leaf of the cone hierarchy. In step 742, visibility search algorithm conditionally searches the subcones of the first cone with respect to the first bound in response to an affirmative determination that the first bound is a leaf bound and the first cone is a non-leaf cone.

FIG. 18 illustrates step 742, i.e. the step of conditionally searching subcones of the first cone with respect to the first bound by means of a generic first subcone. The generic representative is intended to typify the process of conditionally searching any of the subcones of the first cone. In step 749 the visibility search algorithm computes a cone-bound separation value for the first bound with respect to the first subcone. In step 750, the visibility search algorithm determines whether the cone-bound separation value satisfies an inequality condition with respect to a measurement value associated with the first subcone. In one embodiment, the cone-bound separation value is computed using the same method as used to compute the first measurement value in step 504A. In this case, the sense of the inequality tested in step 750 may be consistent with the sense of the inequality tested in step 504B.

In step 752, the visibility search algorithm searches the first subcone with respect to the first bound in response to an affirmative determination that the cone-bound separation value satisfies the inequality condition with respect to the measurement value associated with the first subcone.

After the subcones of the first cone have been searched against the first bound, the measurement value associated with the first cone is updated. Namely, the measurement value associated with the first cone may be set equal to an extremum (i.e. maximum or minimum) of the measurement values associated with the subcones of the first cone. The choice of the maximum as the extremum is associated with embodiments which compute cone-bound separation based on an increasing function of separation. The choice of minimum as the extremum is associated with embodiments which compute cone-bound separation based on a decreasing function of separation.

A Non-Terminal Cone with a Non-Terminal Bound

FIG. 19 illustrates a fourth portion of step 504C, i.e. the step of searching the first bound with respect to the first cone when neither the first cone nor the first bound are leaf nodes of their respective hierarchies. In step 759, the visibility search algorithm computes a first cone-bound separation value for the first bound with respect to a first subcone of the first cone. In step 760, the visibility search algorithm determines whether the first cone-bound separation value satisfies an inequality condition with respect to a measurement value associated with the first subcone. In one embodiment, the first cone-bound separation value is computed using the same method used to compute the first measurement value in step 504A. In this case, the sense of the inequality tested in step 760 may be consistent with the sense of the inequality tested in step 504B. In step 762, the visibility search algorithm conditionally explores subbounds of the first bound with respect to the first subcone in response to an affirmative determination that the first cone-bound separation value satisifes the inequality condition with respect to the measurement value associated with the first subcone.

FIG. 20 illustrates step 762, i.e. the step of conditionally exploring the subhulls of the first hull with respect to the first subcone. In step 770, the visibility search algorithm computes a second cone-bound separation value for each of the subbounds of the first bound with respect to the first subcone. The second cone-bound separation values may be computed using the same method as used to compute the first measurement value in step 504A. In step 772, the visibility search algorithm conditionally searches the subbounds of the first bound with respect to the first subcone in ascending order of their separation from the first subcone, i.e. subbounds which are closer to the first subcone are searched first. This ordering of the search advantageously allows closer subbounds to preempt the search of farther subbounds, and thus unneeded searches are avoided.

FIG. 21 illustrates step 772, i.e. the step of conditionally searching subbounds of the first bound with respect to the first subcone. A generic subhull of the first hull is used to illustrate the conditioned search. In step 780, the visibility search algorithm determines whether the second cone-hull separation value for a first subbound among the subbounds of the first bound satisfies an inequality condition with respect to the measurement value associated with the first subcone. It is noted that the sense of the inequality tested in step 780 may be similar to the sense of the inequality tested in step 504B, especially if the method used to compute the second cone-hull separation value is the same as that used to compute the first measurement value.

In step 782, the visibility search algorithm searches the first subbound with respect to the first subcone in response to an affirmative determination that the second cone-hull separation value for the first subbound satisfies the inequality condition with respect to the measurement value associated with the first subcone.

After the subbounds of the first bound have been searched against the first subcone, a second subcone of the first cone is tested. In particular, the visibility search algorithm computes a measure of the separation of the first bound from the second subcone. If this measure of separation satisfies an inequality condition with respect to a measurement value associated with the second subcone, then subbounds of the first bound may be conditionally explored with respect to the second subcone. The conditional exploration of the second subcone is similar to the conditonal exploration of the first subcone described in conjunction with FIGS. 20 and 21.

After all subcones of the first cone have been tested and conditionally searched as described above, the measurement value associated with the first cone is set equal to an extremum of the measurement values associated with the subcones. As noted above, the maximum is chosen as the extremum in embodiments which use an increasing function of separation to compute cone-bound separation values, and the minimum is chosen in embodiments which use a decreasing function of separation to compute the cone-bound separation values.

In one alternate embodiment, the leaf-cones subtend angular sectors larger than one pixel. Thus, after termination of the visibility search algorithm described above, the leaf-cones may be further processed by a ray-based exploration method to determine the values for individual pixels within leaf-cones.

Although the search of the bounding hierarchy and the cone hierarchy described above assumes a recursive form, alternate embodiments are contemplated where a level-order search or iterative search is performed on one or both of the bounding hierarchy and cone hierarchy.

Computing the Cone Restricted Distance Function

Recall that evaluation of the cone-hull distance $f_c(H)$ of a hull H from a cone C calls for minimizing $\|x\|$ subject to the hull constraints $Ax \leq b$ and the cone constraints $Sx \leq 0$. The rows of matrix A comprise normals for the hull surfaces. The rows of matrix S comprise normals for the cone surfaces. This minimization may be formulated as a nonlinear programming problem. For example, the nonlinear programming problem reduces to a quadratic programming problem when a Euclidean norm is used, and a linear programming problem when the $L^1$ norm is used. The cone-hull distance computation is herein referred to as a geometric query.

It is also noted that cone-hull separation may be measured by maximizing an increasing function separation such as $\|x\|^{-1}$ for points x satisfying the bound/hull constraints and the cone constraints. Thus, in general a cone-hull separation value may be computed by determining an extremal (i.e. minimal or maximal) value of the separation function subject to the cone constraints and the bound/hull constraints.

The use of a hierarchy of cones instead of a collection of rays is motivated by the desire for computational efficiency. Thanks to early candidate pruning that results from the double recursion illustrated earlier, fewer geometric queries are performed. These queries however are more expensive than the queries used in the ray casting method. Therefore, the cone query calculation must be designed meticulously. A sloppy algorithm could end up wasting most of the computational advantage provided by improvements in the dual tree search. For the linear programming case, a method for achieving a computationally tight query will now be outlined.

A piecewise-linear formulation of distance $f_c$ leads to the following linear program:

$$\min(v^T x) \text{ subject to } Ax \leq b, Sx \leq 0.$$

The vector v is some member of the cone that is polar to the cone C. For instance, $v = -S^T e$, where e is the vector of all ones. [It is noted that the matrix S of cone normals S are outward normals to the cone surfaces. Thus, the negation of the sum of the normal vectors gives a polar vector.] The condition $Ax \leq b$ implies that the point x is within the bounding hull. The condition $Sx \leq 0$ implies that the point x is within the cone C. For an efficient solution method, the linear program problem is restated in term of its dual:

$$\max(b^T y) \text{ subject to } A^T y + S^T z = v, 0 \leq y, 0 < z.$$

The dual objective value, $b^T y$ is infinite when the cone and bounding hull do not intersect (the variables y and z are the Lagrange multipliers of the previous problem's constraints).

In the preferred embodiment, the bounding hulls have sides normal to a fixed set of normal vectors. Thus, the matrix $A^T$ is the same for all hulls. For a given cone, the matrix $S^T$ and the vector v are also fixed. From this observation, it is apparent that the multi-dimensional polyhedron $$\{(y,z): A^T y + S^T z = v, 0 \leq y, 0 \leq z\}$$

is associated with the cone. (In one embodiment, this polyhedron has seventeen dimensions. Fourteen of those dimensions come from the type of the fixed-direction bounding hull and an three additional dimensions come from the cone.) Since the polyhedron depends only on the cone matrix S, it is feasible to completely precompute the extremal structure of the polygon for each cone in the cone hierarchy. By complementary slackness, the vertices of the polyhedron will have at most three elements. The edges and extremal rays will have at most four non-zero elements. An abbreviated, simplex-based, hill-climbing technique can be used to quickly solve the query in this setting.

To establish the setting, the orientation of the cone hierarchy needs to be fixed. This is not feasible if the cone hierarchy changes orientation with changes in orientation of the view frustum. Thus, the entire space is tessellated with cones, and visible objects are detected within the entire space. Only after this entire space computation is the set of visible of objects culled to conform to the current view frustum.

In an alternative embodiment, a less aggressive approach may be pursued. Namely, by noting which subsets of the cones correspond to the current orientation of the view frustum, only this subset may be included in the visible-object-set computation.

Memory Media

As described above, the visibility software and visibility search program of the present invention are preferably stored in memory 106 for access by processor 102. In addition, the visibility software and visibility search program may be stored in any desired memory media such as an installation media (e.g. CD-ROM, floppy disk, etc.), a non-volatile memory (e.g. hard disk, optical storage, magnetic tape, zip drive storage, ROM, etc.), various kinds of volatile memory such as RAM, or any combination thereof. The present invention contemplates the deposition and storage of the visibility software and visibility search program on memory media for distribution to end users and/or customers.

Multiple Objects Per Cone

According to the visibility search algorithm, a single nearest object is identified for each leaf cone (i.e. terminal cone). If each of the leaf cones have the ultimate resolution, i.e. the resolution of a pixel, then the strategy of identifying the nearest object in each leaf cone is guaranteed to detect all visible objects. However, the visibility search of the fully resolved cone hierarchy is computationally expensive. The computational expense may be decreased by having fewer levels of refinement in the cone hierarchy. But fewer levels of refinement implies that the size of the leaf cones is larger. As the size of the leaf cones increases, there is an increasing probability that two or more objects will be visible to a single leaf cone, i.e. that the nearest object is not the only object visible to the cone. Therefore, there is an increased probably of reporting less than the full set of visible objects as the size of the leaf-cones increases, or equivalently, when fewer levels of cone refinement as used in the cone hierarchy.

In order to increase the probability of capturing the full set of visible objects, the visibility search algorithm may be modified to identify the first K nearest objects for each leaf cone, where K is an integer greater than or equal to two. Advantageously the integer K may be a function cone size. Thus, if the cone hierarchy is close to ultimate resolution K may be close to one. Conversely, if the cone hierarchy is poorly resolved, i.e. includes only a few levels of refinement, the integer K may be larger.

The present invention contemplates maximizing computational efficiency along the axis of high-cone-resolution/low-K-value on the one hand and low-cone-resolution/high-K-value on the other.

Adaptive Refinement of the Cone Hierarchy

In the foregoing discussion, the cone hierarchy is described as being constructed prior to initiation of the search for visible objects by the visibility search algorithm, and remains static during the search. Another alternative is to adaptively refine the cone hierarchy during the search procedure. In this fashion, the cone hierarchy may not waste storage for cones which will never interact with any objects. The cone hierarchy may be refined in response to user inputs. For example, cones which correspond to the user's current direction of gaze may warrant additional refinement. A given cone may remain unrefined until the search procedure discovers a bound which interacts with the given cone, at which time the cone may be refined. The refinement of a given cone may be further refined as additional interacting objects/bounds are discovered in order to more adequately distinguish the objects. In the context where objects are in motion, the movement of an object into a given cone's field of view may induce increased refinement of the given cone. If the user in a virtual environment stops to look at a given object, the cones defining that object may be increasingly refined.

Refinement of the cone hierarchy may be subject to the availability of computational cycles. According to the paradigm of successive warming, the initial cone tree may have only one or a few cones allowing a crude initial estimate of visible object set to be immediately displayed. As computational cycles become available the cone hierarchy may be successively refined and searched in order to provide an increasingly accurate display of the visible object set.

In general the cones of the cone hierarchy may be at differing levels of refinement. Cone refinement is allowed only if the cone interacts with an object or bound (e.g. hull). Adaptive refinement of a cone terminates when the cone resolution equals that of a pixel or when no object occurs in the cone.

It is noted that a combination of fixed refinement and adaptive refinement of the cone hierarchy may be used.

The present invention also contemplates adaptively refining the cone hierarchy and identifying the K nearest objects/bound for each cone, where K changes the refinement level changes.

Non-Occluding Objects

Non-occluding objects are objects which do not totally occlude (i.e. block visibility) of other objects. For example, a transparent, semi-transparent, or translucent object may be a non-occluder. A screen door, tinted glass, a window with slats may be classified as non-occluders. Objects behind a non-occluder may be partially visible. The present invention contemplates certain modifications to the visibility search algorithm to allow for the presence on non-occluding objects (NOOs) in the collection of objects to be searched. In particular, the visibility search algorithm may be configured to search for the first K nearest occluding objects and any NOO closer than the $K^{th}$ occluder in each leaf cone, where K may be a function of leaf cone size.

Appendix: Source Code for the Find Visibility Function

The following source code illustrates one embodiment for the recursive search of the hull tree and cone tree is order to identify visible objects for each leaf-cone.

```
findVisible(hull, cone, distance) {
    if (leaf(hull) && leaf(cone)) {
        cone.extent = = distance(hull, cone);
        cone.object = = hull;
    return;
    }
    if(leaf(cone)) {
        leftD = distance(lefy(hull), cone);
        rightD = distance(right(hull), cone);
        if(leftD < rightD) {
            if(leftD < cone.extent)
                findVisible(left(hull), cone, leftD);
            if(rightD < cone.extent)
                findVisible(right(hull), cone, rightD);
        } else {
            if(rightD < cone.extent)
                findVisible(right(hull), cone, rightD);
            if(leftD < cone.extent)
                findVisible(left(hull), cone, leftD);
        }
        return;
    }
    if(leaf(hull)) {
        leftD = distance(hull, left(cone));
        rightD = distance(hull, right(cone));
        if(leftD < left(cone).extent)
            findVisible(hull, left(cone), leftD);
        if(rightD < right(cone).extent)
            findVisible(hull, right(cone), rightD);
        cone.extent = max(left(cone).extent, right(cone). extent);
        return;
    }
    hullLeftConeD = distance(hull, left(cone));
    hullRightConeD = distance(hull, right(cone));
    if(hullLeftConeD < left(cone).extent) {
        lHullLConeD = distance(left(hull), left(cone));
        rHullLConeD = distance(right(hull), left(cone));
        if(lHullLConeD < rHullLConeD) {
            if(lHullLConeD < left(cone).extent)
                findVisible(left(hull), left(cone), lHullLConeD);
            if(rHullLConeD < left(cone).extent)
                findVisible(right(hull), left(cone), rHullLConeD);
        } else {
            if(rHullLConeD < left(cone).extent))
                findVisible(right(hull), left(cone), rHullLConeD);
            if(lHullLConeD < left(cone).extent))
                findVisible(left(hull), left(cone), lHullLConeD);
        }
    }
    if(hullRightConeD < right(cone).extent) {
        lHullRConeD = distance(left(hull), right(cone));
        rHullRConeD = distance(right(hull), right(cone));
        if(lHullRConeD < rHullRConeD) {
            if(lHullRConeD < right(cone).extent)
                findVisible(left(hull), right(cone), lHullRConeD);
            if(rHullRConeD < right(cone).extent)
                findVisible(right(hull), right(cone), rHullRConeD);
        } else {
            if(rHullRConeD < right(cone).extent)
                findVisible(right(hull), right(cone), rHullRConeD);
            if(lHullRConeD < right(cone).extent)
                findVisible(left(hull), right(cone), lHullRConeD);
        }
    }
    cone.extent = max(left(cone).extent, right(cone).extent);
    return
}
```

What is claimed is:

1. A method for displaying visible objects on a display device, the method comprising:
   accessing a collection of objects;

constructing a bounding hierarchy from the collection of objects;

constructing a cone hierarchy;

searching the cone hierarchy and the bounding hierarchy to determine nearest objects for a subset of cones of the cone hierarchy; and displaying the nearest objects for the subset of cones of the cone hierarchy.

2. The method of claim 1, wherein said subset of cones comprises the leaf cones of the cone hierarchy.

3. The method of claim 1, wherein, for a first cone in the cone hierarchy and a first bound in the bounding hierarchy, said searching includes:

determining a first measurement value of separation between the first cone and the first bound;

determining whether the first measurement value satisfies an inequality condition with respect to a measurement value associated with the first cone;

searching the first bound with respect to the first cone in response to an affirmative determination that the first measurement value satisfies the inequality condition with respect to the measurement value associated with the first cone.

4. The method of claim 3, wherein said constructing the bounding hierarchy comprises:

clustering said objects to form clusters;

bounding each object and each cluster with a corresponding bound;

allocating a node in the bounding hierarchy for each object and each cluster;

associating parameters with each node, wherein the parameters associated with the node describe the corresponding bound;

organizing the nodes so that node relationships represent cluster membership.

5. The method of claim 4, wherein the bound for each object and each cluster is a hull.

6. The method of claim 3, wherein said determining the first measurement of separation between the first cone and the first bound comprises computing a penalty of separation between the first cone and the first bound.

7. The method of claim 6, wherein said computing the penalty of separation between the first cone and the first bound comprises performing computations which minimize an increasing function of separation distance between the vertex of the first cone and points in the intersection of the first cone and the first bound.

8. The method of claim 7, wherein said determining whether the first measurement value satisfies the inequality condition comprises determining whether the first measurement value is smaller than the measurement value associated with the first cone.

9. The method of claim 7, wherein the increasing function of separation distance comprises a distance measure given by $\|s\|$, wherein s is a displacement vector representing the separation between the vertex of the first cone and a point in the intersection of the first cone and the first bound, wherein $\|.\|$ denotes a vector norm.

10. The method of claim 3, wherein said determining the first measurement of separation between the first cone and the first bound comprises computing a merit of separation between the first cone and the first bound.

11. The method of claim 10, wherein said computing the merit of separation between the first cone and the first bound comprises performing computations which maximize a decreasing function of separation distance between the vertex of the first cone and points in the intersection of the first cone and the first bound.

12. The method of claim 11, wherein said determining whether the first measurement value satisfies the inequality condition comprises determining whether the first measurement value is larger than the measurement value associated with the first cone.

13. The method of claim 3, wherein said determining the first measurement value of separation between the first cone and the first bound comprises solving a nonlinear programming problem using a first set of constraints defining the first cone and a second set of constraints defining the first bound in order to determine an extremal distance between the vertex of the first cone and points in the intersection of the first cone and the first bound.

14. The method of claim 13, wherein said solving a nonlinear programming problem comprises solving a linear programming problem.

15. The method of claim 13, wherein said solving a nonlinear programming problem comprises solving a quadratic programming problem.

16. The method of claim 3, wherein said cone hierarchy is generated by refining an initial cone.

17. The method of claim 16, wherein said initial cone contains a view frustum.

18. The method of claim 17, wherein said initial cone is a view frustrum.

19. The method of claim 16, wherein said initial cone is the entire space.

20. The method of claim 3, wherein said searching the cone hierarchy and the bounding hierarchy comprises performing a level order search of the cone hierarchy.

21. The method of claim 3, wherein said searching the cone hierarchy and the bounding hierarchy comprises performing a level order search of the bounding hierarchy.

22. The method of claim 3, wherein said searching the cone hierarchy and the bounding hierarchy comprises performing an iterative search of said cone hierarchy.

23. The method of claim 3, wherein said searching the cone hierarchy and the bounding hierarchy comprises performing an iterative search of the bounding hierarchy.

24. The method of claim 3, wherein said searching the cone hierarchy and the bounding hierarchy comprises performing a recursive search of said cone hierarchy.

25. The method of claim 3, wherein said searching the cone hierarchy and the bounding hierarchy comprises performing a recursive search of the bounding hierarchy.

26. The method of claim 3, further comprising initializing each cone of the cone hierarchy with a measurement value which corresponds to un-occluded visibility.

27. The method of claim 3, wherein said searching the first bound with respect to the first cone comprises:

determining whether or not said first cone is a leaf of the cone hierarchy and said first bound is a leaf of the bounding hierarchy;

setting the measurement value associated with the first cone equal to the first measurement value of separation between the first bound and the first cone;

setting a visible object attribute associated with the first cone equal to the first bound;

wherein said setting of the measurement value associated with the first cone and said setting of the visible object attribute associated with the first cone are performed in response to an affirmative determination that the first cone is a leaf of the cone hierarchy and the first bound is a leaf of the hull hierarchy.

28. The method of claim 3, wherein said searching the first bound with respect to the first cone comprises:
  determining whether said first cone is a leaf of the cone hierarchy and said first bound is not a leaf of the bounding hierarchy;
  conditionally exploring sub-bounds of said first bound with respect to said first cone in response to an affirmative determination that said first cone is a leaf of the cone hierarchy and said first bound is not a leaf of the bounding hierarchy.

29. The method of claim 28, wherein said conditionally exploring sub-bounds of said first bound includes:
  computing a cone-bound separation value for each of the sub-bounds of the first bound with respect to said first cone;
  conditionally searching said sub-bounds of said first bound with respect to said first cone in ascending order of separation from the first cone.

30. The method of claim 29, wherein said conditionally searching said sub-bounds of said first bound includes:
  determining whether the cone-bound separation value of a first subbound among said subbounds satisfies the inequality condition with respect to the measurement value associated with the first cone;
  searching said first sub-bound with respect to said first cone in response to an affirmative determination that said cone-bound separation value of said first sub-bound satisfies the inequality condition with respect to the measurement value associated with the first cone.

31. The method of claim 3, wherein said searching of the first bound with respect to the first cone includes:
  determining if the first bound is a leaf of the bounding hierarchy and the first cone is not a leaf of the cone hierarchy;
  conditionally searching subcones of the first cone with respect to the first bound in response to an affirmative determination that said first bound is a leaf of the bounding hierarchy and said first cone is not a leaf of the cone hierarchy.

32. The method of claim 31, wherein said conditionally searching subcones of the first cone with respect to the first bound includes:
  computing a cone-bound separation value for the first bound with respect to a first subcone of the first cone;
  determining whether the cone-bound separation value satisfies the inequality condition with respect to a measurement value associated with the first subcone;
  searching said first subcone with respect to said first bound in response to an affirmative determination that said cone-bound separation value satisfies the inequality condition with respect to the measurement value associated with the first subcone.

33. The method of claim 32, wherein said searching the first bound with respect to the first cone further comprises setting the measurement value associated with the first cone equal to an extremum of the measurement values associated with said subcones after said conditionally searching said subcones with respect to the first bound.

34. The method of claim 3, wherein said searching the first bound with respect to the first cone includes:
  computing a first cone-bound separation value for the first bound with respect to a first subcone of the first cone;
  determining whether the first cone-bound separation value satisfies the inequality condition with respect to a measurement value associated with said first subcone;
  conditionally exploring subbounds of said first bound with respect to said first subcone in response to an affirmative determination that said first cone-bound separation value satisfies the inequality condition with respect to the measurement value associated with the first subcone.

35. The method of claim 34, wherein said conditionally exploring subbounds of said first bound with respect to said first subcone includes:
  computing a second cone-bound separation value for each of said subbounds with respect to said first subcone;
  conditionally searching said subbounds of said first bound with respect to said first subcone in ascending order of their separation from the first subcone.

36. The method of claim 35, wherein said conditionally searching said subbounds of said first bound with respect to said first subcone includes:
  determining whether the second cone-hull separation value for a first subbound among said subbounds satisfies the inequality condition with respect to the measurement value associated with the first subcone;
  searching said first subbound with respect to said first subcone in response to an affirmative determination that said second cone-hull separation value for the first subbound satisfies the inequality condition with respect to the measurement value associated with the first subcone.

37. The method of claim 36, wherein said searching the first bound with respect to the first cone further comprises setting the measurement value associated with the first cone equal to an extremum of the measurement values associated with subcones of the first cone including said first subcone.

38. The method of claim 2, wherein each of the leaf cones of the cone hierarchy subtends an area of a screen on the display device.

39. The method of claim 38, wherein said area contains one or more pixels.

40. The method of claim 38, wherein said area corresponds to a portion of a pixel.

41. A computer system which displays visible objects, the computer system comprising:
  a display device;
  a memory for storing a collection of objects, wherein the memory also stores a visibility search program;
  a processor coupled to the memory which executes the visibility search program, wherein, under the control of the visibility search program, the processor is configured to:
    access the collection of objects;
    construct a bounding hierarchy from the collection of objects;
    construct a cone hierarchy;
    search the cone hierarchy and the bounding hierarchy to determine nearest objects for a subset of cones of the cone hierarchy;
  wherein the display device is operable to display the nearest objects for the subset of cones in the cone hierarchy.

42. The computer system of claim 41, wherein the subset of cones comprises the leaf cones of the cone hierarchy.

43. The computer system of claim 41, wherein, in performing said search of the cone hierarchy and the bounding hierarchy, said processor is configured to:
  determine a first measurement value of separation between a first cone of the cone hierarchy and a first bound of the bounding hierarchy;

determine whether the first measurement value satisfies an inequality condition with respect to a measurement value associated with the first cone;

search the first bound with respect to the first cone in response to an affirmative determination that the first measurement value satisfies the inequality condition with respect to the measurement value associated with the first cone.

44. The computer system of claim 43 further comprising a graphics accelerator coupled to the processor, wherein said processor is configured to transmit visibility information including a specification of the nearest object for each leaf cone of the cone hierarchy to the graphics accelerator, wherein the graphics accelerator is configured to render an image on the display screen based on the nearest object for each leaf cone of the cone hierarchy.

45. The computer system of claim 43, wherein, in order to construct the bounding hierarchy, the processor is operable to:

cluster said objects to form clusters;

bound each object and each cluster with a corresponding bound;

allocate a node in the bounding hierarchy for each object and each cluster;

associate parameters with each node, wherein the parameters associated with each node describe the corresponding bound;

organize the nodes so that node relationships represent cluster membership.

46. The computer system of claim 45, wherein the bound for each object and each cluster is a hull.

47. The computer system of claim 43, wherein, in order to determine the first measurement of separation between the first cone and the first bound, the processor computes a penalty of separation between the first cone and the first bound.

48. The computer system of claim 47, wherein, in computing the penalty of separation between the first cone and the first bound, the processor performs computations which minimize an increasing function of separation distance between the vertex of the first cone and points in the intersection of the first cone and the first bound.

49. The computer system of claim 48, wherein, in determining whether the first measurement value satisfies the inequality condition, the processor determines whether the first measurement value is smaller than the measurement value associated with the first cone.

50. The computer system of claim 48, wherein the increasing function of separation distance comprises a distance measure given by $\|s\|$, wherein s is a displacement vector representing the separation between the vertex of the first cone and a point in the intersection of the first cone and the first bound, wherein $\|.\|$ denotes a vector norm.

51. The computer system of claim 43, in determining the first measurement of separation between the first cone and the first bound, the processor computes a merit of separation between the first cone and the first bound.

52. The computer system of claim 51, wherein, in computing the merit of separation between the first cone and the first bound, the processor performs computations which maximize a decreasing function of separation distance between the vertex of the first cone and points in the intersection of the first cone and the first bound.

53. The computer system of claim 52, wherein, in determining whether the first measurement value satisfies the inequality condition, the processor determines whether the first measurement value is larger than the measurement value associated with the first cone.

54. The computer system of claim 43, wherein, in determining the first measurement value of separation between the first cone and the first bound, the processor solves a nonlinear programming problem using a first set of constraints defining the first cone and a second set of constraints defining the first bound in order to determine an extremal distance between the vertex of the first cone and points in the intersection of the first cone and the first bound.

55. The computer system of claim 54, wherein the nonlinear programming problem comprises a linear programming problem.

56. The computer system of claim 54, wherein the nonlinear programming problem comprises a quadratic programming problem.

57. The computer system of claim 43, wherein the processor constructs the cone hierarchy by refining an initial cone.

58. The method of claim 57, wherein said initial cone contains a view frustum.

59. The method of claim 58, wherein said initial cone is a view frustum.

60. The method of claim 57, wherein said initial cone is the entire space.

61. The computer system of claim 43, wherein, in searching the cone hierarchy and the bounding hierarchy, the processor performs a level order search of the cone hierarchy.

62. The computer system of claim 43, wherein, in searching the cone hierarchy and the bounding hierarchy, the processor performs a level order search of the bounding hierarchy.

63. The computer system of claim 43, wherein, in searching the cone hierarchy and the bounding hierarchy, the processor performs an iterative search of said cone hierarchy.

64. The computer system of claim 43, wherein, in searching the cone hierarchy and the bounding hierarchy, the processor performs an iterative search of the bounding hierarchy.

65. The computer system of claim 43, wherein, in searching the cone hierarchy and the bounding hierarchy, the processor performs a recursive search of said cone hierarchy.

66. The computer system of claim 43, wherein, in searching the cone hierarchy and the bounding hierarchy, the processor performs a recursive search of the bounding hierarchy.

67. The computer system of claim 43 wherein said processor initializes each cone of the cone hierarchy with a measurement value which corresponds to un-occluded visibility.

68. The computer system of claim 43, wherein, in searching the first bound with respect to the first cone, the processor is configured to:

determine whether or not said first cone is a leaf of the cone hierarchy and said first bound is a leaf of the bounding hierarchy;

set the measurement value associated with the first cone equal to the first measurement value of separation between the first bound and the first cone;

set a visible object attribute associated with the first cone equal to the first bound;

wherein said setting of the measurement value associated with the first cone and said setting of the visible object attribute associated with the first cone are performed in response to an affirmative determination that the first cone is a leaf of the cone hierarchy and the first bound is a leaf of the hull hierarchy.

69. The computer system of claim 43, wherein, in searching the first bound with respect to the first cone, the processor is configured to:
   determine whether said first cone is a leaf of the cone hierarchy and said first bound is not a leaf of the bounding hierarchy;
   conditionally explore sub-bounds of said first bound with respect to said first cone in response to an affirmative determination that said first cone is a leaf of the cone hierarchy and said first bound is not a leaf of the bounding hierarchy.

70. The computer system of claim 69, wherein, in conditionally exploring sub-bounds of said first bound, the processor is configured to:
   compute a cone-bound separation value for each of the sub-bounds of the first bound with respect to said first cone;
   conditionally search said sub-bounds of said first bound with respect to said first cone in ascending order of separation from the first cone.

71. The computer system of claim 70, wherein, in conditionally searching said sub-bounds of said first bound, the processor is configured to:
   determine whether the cone-bound separation value of a first subbound among said subbounds satisfies the inequality condition with respect to the measurement value associated with the first cone;
   search said first sub-bound with respect to said first cone in response to an affirmative determination that said cone-bound separation value of said first sub-bound satisfies the inequality condition with respect to the measurement value associated with the first cone.

72. The computer system of claim 43, wherein, in searching the first bound with respect to the first cone, the processor is configured to:
   determine if the first bound is a leaf of the bounding hierarchy and the first cone is not a leaf of the cone hierarchy;
   conditionally search subcones of the first cone with respect to the first bound in response to an affirmative determination that said first bound is a leaf of the bounding hierarchy and said first cone is not a leaf of the cone hierarchy.

73. The computer system of claim 72, wherein, in conditionally searching subcones of the first cone with respect to the first bound, the processor is configured to:
   computing a cone-bound separation value for the first bound with respect to a first subcone of the first cone;
   determining whether the cone-bound separation value satisfies the inequality condition with respect to a measurement value associated with the first subcone;
   searching said first subcone with respect to said first bound in response to an affirmative determination that said cone-bound separation value satisfies the inequality condition with respect to the measurement value associated with the first subcone.

74. The computer system of claim 73, wherein, in searching the first bound with respect to the first cone further, the processor sets the measurement value associated with the first cone equal to an extremum of the measurement values associated with said subcones after said conditionally searching said subcones with respect to the first bound.

75. The computer system of claim 43, wherein, in searching the first bound with respect to the first cone, the processor is configured to:
   compute a first cone-bound separation value for the first bound with respect to a first subcone of the first cone;
   determine whether the first cone-bound separation value satisfies the inequality condition with respect to a measurement value associated with said first subcone;
   conditionally explore subbounds of said first bound with respect to said first subcone in response to an affirmative determination that said first cone-bound separation value satisfies the inequality condition with respect to the measurement value associated with the first subcone.

76. The computer system of claim 75, wherein, in conditionally exploring subbounds of said first bound with respect to said first subcone, the processor is configured to:
   compute a second cone-bound separation value for each of said subbounds with respect to said first subcone;
   conditionally search said subbounds of said first bound with respect to said first subcone in ascending order of their separation from the first subcone.

77. The computer system of claim 76, wherein, in conditionally searching said subbounds of said first bound with respect to said first subcone, the processor is configured to:
   determine whether the second cone-hull separation value for a first subbound among said subbounds satisfies the inequality condition with respect to the measurement value associated with the first subcone;
   search said first subbound with respect to said first subcone in response to an affirmative determination that said second cone-hull separation value for the first subbound satisfies the inequality condition with respect to the measurement value associated with the first subcone.

78. The computer system of claim 77, wherein, in order to search the first bound with respect to the first cone, the processor sets the measurement value associated with the first cone equal to an extremum of the measurement values associated with subcones of the first cone including said first subcone.

79. The computer system of claim 42, wherein each of the leaf cones of the cone hierarchy subtends an area of a screen on the display device.

80. The computer system of claim 79, wherein said area contains one or more pixels.

81. The computer system of claim 79, wherein said area corresponds to a portion of a pixel.

82. A memory media which stores program instructions for determining visible objects for display on a display device, wherein the program instructions are executable by a processor to implement:
   accessing a collection of objects;
   constructing a bounding hierarchy from the collection of objects;
   constructing a cone hierarchy;
   searching the cone hierarchy and the bounding hierarchy to determine nearest objects for a subset of cones of the cone hierarchy;
   displaying the nearest objects for the subset of cones of the cone hierarchy.

83. The memory media of claim 82, wherein the subset of cones comprises the leaf cones of the cone hierarchy.

84. The memory media of claim 82, wherein, for a first cone in the cone hierarchy and a first bound in the bounding hierarchy, said searching includes:
   determining a first measurement value of separation between the first cone and the first bound;

determining whether the first measurement value satisfies an inequality condition with respect to a measurement value associated with the first cone;

searching the first bound with respect to the first cone in response to an affirmative determination that the first measurement value satisfies the inequality condition with respect to the measurement value associated with the first cone.

85. The memory media of claim 84, wherein said constructing the bounding hierarchy comprises:

clustering said objects to form clusters;

bounding each object and each cluster with a corresponding bound;

allocating a node in the bounding hierarchy for each object and each cluster;

associating parameters with each node, wherein the parameters associated with the node describe the corresponding bound;

organizing the nodes so that node relationships represent cluster membership.

86. The memory media of claim 85, wherein the bound for each object and each cluster is a hull.

87. The memory media of claim 84, wherein said determining the first measurement of separation between the first cone and the first bound comprises computing a penalty of separation between the first cone and the first bound.

88. The memory media of claim 87, wherein said computing the penalty of separation between the first cone and the first bound comprises performing computations which minimize an increasing function of separation distance between the vertex of the first cone and points in the intersection of the first cone and the first bound.

89. The memory media of claim 88, wherein said determining whether the first measurement value satisfies the inequality condition comprises determining whether the first measurement value is smaller than the measurement value associated with the first cone.

90. The memory media of claim 88, wherein the increasing function of separation distance comprises a distance measure given by $\|s\|$, wherein s is a displacement vector representing the separation between the vertex of the first cone and a point in the intersection of the first cone and the first bound, wherein $\|.\|$ denotes a vector norm.

91. The memory media of claim 84, wherein said determining the first measurement of separation between the first cone and the first bound comprises computing a merit of separation between the first cone and the first bound.

92. The memory media of claim 91, wherein said computing the merit of separation between the first cone and the first bound comprises performing computations which maximize a decreasing function of separation distance between the vertex of the first cone and points in the intersection of the first cone and the first bound.

93. The memory media of claim 92, wherein said determining whether the first measurement value satisfies the inequality condition comprises determining whether the first measurement value is larger than the measurement value associated with the first cone.

94. The memory media of claim 84, wherein said determining the first measurement value of separation between the first cone and the first bound comprises solving a nonlinear programming problem using a first set of constraints defining the first cone and a second set of constraints defining the first bound in order to determine an extremal distance between the vertex of the first cone and points in the intersection of the first cone and the first bound.

95. The memory media of claim 94, wherein said solving a nonlinear programming problem comprises solving a linear programming problem.

96. The memory media of claim 94, wherein said solving a nonlinear programming problem comprises solving a quadratic programming problem.

97. The memory media of claim 84, wherein said cone hierarchy is generated by refining an initial cone.

98. The memory media of claim 97, wherein said initial cone contains a view frustum.

99. The memory media of claim 98, wherein said initial cone is a view frustum.

100. The memory media of claim 97, wherein said initial cone is the entire space.

101. The memory media of claim 84, wherein said searching the cone hierarchy and the bounding hierarchy comprises performing a level order search of the cone hierarchy.

102. The memory media of claim 84, wherein said searching the cone hierarchy and the bounding hierarchy comprises performing a level order search of the bounding hierarchy.

103. The memory media of claim 84, wherein said searching the cone hierarchy and the bounding hierarchy comprises performing an iterative search of said cone hierarchy.

104. The memory media of claim 84, wherein said searching the cone hierarchy and the bounding hierarchy comprises performing an iterative search of the bounding hierarchy.

105. The memory media of claim 84, wherein said searching the cone hierarchy and the bounding hierarchy comprises performing a recursive search of said cone hierarchy.

106. The memory media of claim 84, wherein said searching the cone hierarchy and the bounding hierarchy comprises performing a recursive search of the bounding hierarchy.

107. The memory media of claim 84, further comprising initializing each cone of the cone hierarchy with a measurement value which corresponds to un-occluded visibility.

108. The memory media of claim 84, wherein said searching the first bound with respect to the first cone comprises:

determining whether or not said first cone is a leaf of the cone hierarchy and said first bound is a leaf of the bounding hierarchy;

setting the measurement value associated with the first cone equal to the first measurement value of separation between the first bound and the first cone;

setting a visible object attribute associated with the first cone equal to the first bound;

wherein said setting of the measurement value associated with the first cone and said setting of the visible object attribute associated with the first cone are performed in response to an affirmative determination that the first cone is a leaf of the cone hierarchy and the first bound is a leaf of the hull hierarchy.

109. The memory media of claim 84, wherein said searching the first bound with respect to the first cone comprises:

determining whether said first cone is a leaf of the cone hierarchy and said first bound is not a leaf of the bounding hierarchy;

conditionally exploring sub-bounds of said first bound with respect to said first cone in response to an affirmative determination that said first cone is a leaf of the cone hierarchy and said first bound is not a leaf of the bounding hierarchy.

110. The memory media of claim 109, wherein said conditionally exploring sub-bounds of said first bound includes:

computing a cone-bound separation value for each of the sub-bounds of the first bound with respect to said first cone;

conditionally searching said sub-bounds of said first bound with respect to said first cone in ascending order of separation from the first cone.

111. The memory media of claim 110, wherein said conditionally searching said sub-bounds of said first bound includes:
  determining whether the cone-bound separation value of a first subbound among said subbounds satisfies the inequality condition with respect to the measurement value associated with the first cone;
  searching said first sub-bound with respect to said first cone in response to an affirmative determination that said cone-bound separation value of said first sub-bound satisfies the inequality condition with respect to the measurement value associated with the first cone.

112. The memory media of claim 84, wherein said searching of the first bound with respect to the first cone includes:
  determining if the first bound is a leaf of the bounding hierarchy and the first cone is not a leaf of the cone hierarchy;
  conditionally searching subcones of the first cone with respect to the first bound in response to an affirmative determination that said first bound is a leaf of the bounding hierarchy and said first cone is not a leaf of the cone hierarchy.

113. The memory media of claim 112, wherein said conditionally searching subcones of the first cone with respect to the first bound includes:
  computing a cone-bound separation value for the first bound with respect to a first subcone of the first cone;
  determining whether the cone-bound separation value satisfies the inequality condition with respect to a measurement value associated with the first subcone;
  searching said first subcone with respect to said first bound in response to an affirmative determination that said cone-bound separation value satisfies the inequality condition with respect to the measurement value associated with the first subcone.

114. The memory media of claim 113, wherein said searching the first bound with respect to the first cone further comprises setting the measurement value associated with the first cone equal to an extremum of the measurement values associated with said subcones after said conditionally searching said subcones with respect to the first bound.

115. The memory media of claim 84, wherein said searching the first bound with respect to the first cone includes:
  computing a first cone-bound separation value for the first bound with respect to a first subcone of the first cone;
  determining whether the first cone-bound separation value satisfies the inequality condition with respect to a measurement value associated with said first subcone;
  conditionally exploring subbounds of said first bound with respect to said first subcone in response to an affirmative determination that said first cone-bound separation value satisfies the inequality condition with respect to the measurement value associated with the first subcone.

116. The memory media of claim 115, wherein said conditionally exploring subbounds of said first bound with respect to said first subcone includes:
  computing a second cone-bound separation value for each of said subbounds with respect to said first subcone;
  conditionally searching said subbounds of said first bound with respect to said first subcone in ascending order of their separation from the first subcone.

117. The memory media of claim 116, wherein said conditionally searching said subbounds of said first bound with respect to said first subcone includes:
  determining whether the second cone-hull separation value for a first subbound among said subbounds satisfies the inequality condition with respect to the measurement value associated with the first subcone;
  searching said first subbound with respect to said first subcone in response to an affirmative determination that said second cone-hull separation value for the first subbound satisfies the inequality condition with respect to the measurement value associated with the first subcone.

118. The memory media of claim 117, wherein said searching the first bound with respect to the first cone further comprises setting the measurement value associated with the first cone equal to an extremum of the measurement values associated with subcones of the first cone including said first subcone.

119. The memory media of claim 83, wherein each of the leaf cones of the cone hierarchy subtends an area of a screen on the display device.

120. The memory media of claim 119, wherein said area contains one or more pixels.

121. The memory media of claim 119, wherein said area corresponds to a portion of a pixel.

122. A method for displaying visible objects on a display device, the method comprising:
  accessing a collection of objects;
  constructing a bounding hierarchy from the collection of objects;
  searching a cone hierarchy and the bounding hierarchy to determine nearest objects for a subset of cones of the cone hierarchy;
  displaying the nearest objects for the subset of cones of the cone hierarchy.

123. The method of claim 122, wherein the subset of cones comprises the leaf cones of the cone hierarchy.

124. The method of claim 122, wherein, for a first cone in the cone hierarchy and a first bound in the bounding hierarchy, said searching includes:
  determining a first measurement value of separation between the first cone and the first bound;
  determining whether the first measurement value satisfies an inequality condition with respect to a measurement value associated with the first cone;
  searching the first bound with respect to the first cone in response to an affirmative determination that the first measurement value satisfies the inequality condition with respect to the measurement value associated with the first cone.

125. The method of claim 122, wherein said constructing the bounding hierarchy comprises:
  clustering said objects to form clusters;
  bounding each object and each cluster with a corresponding bound;
  allocating a node in the bounding hierarchy for each object and each cluster;
  associating parameters with each node, wherein the parameters associated with the node describe the corresponding bound;
  organizing the nodes so that node relationships represent cluster membership.

* * * * *

UNITED STATES PATENT AND TRADEMARK OFFICE
CERTIFICATE OF CORRECTION

PATENT NO. : 6,300,965 B1
DATED : October 9, 2001
INVENTOR(S) : Henry Sowizral and Karel Zikan It is certified that error appears in the above-identified patent and that said Letters Patent is hereby corrected as shown below:

Column 18,
Line 1, please delete "is implemented solving" and substitute -- is implemented by solving --.
Line 57, please delete "several input variable" and substitute -- several input variables --.

Column 19,
Line 18, please delete "determines the cone-hull distance" and substitute -- determines if the cone-hull distance --.

Column 22,
Line 19, please delete "a large array of processor" and substitute -- a large array of processors --.

Column 28,
Lines 63 and 64, please delete "increased probably of reporting" and substitute -- increased probability of reporting --.
Line 66, please delete "as used in the cone hierarchy" and substitute -- are used in the cone hierarchy --.

Column 29,
Line 5, please delete "a function cone size" and substitute -- a function of cone size --.
Line 64, please delete "the presence on non-occluding objects" and substitute -- the presence of non-occluding objects --.

UNITED STATES PATENT AND TRADEMARK OFFICE
CERTIFICATE OF CORRECTION

PATENT NO.   : 6,300,965 B1
DATED        : October 9, 2001
INVENTOR(S)  : Henry Sowizral and Karel Zikan It is certified that error appears in the above-identified patent and that said Letters Patent is hereby corrected as shown below:

Column 36,
Lines 20, 22 and 24, please delete "method" and substitute -- computer system --.

Signed and Sealed this

Thirteenth Day of May, 2003

JAMES E. ROGAN
*Director of the United States Patent and Trademark Office*